(12) United States Patent
Dymetman et al.

(10) Patent No.: US 6,901,360 B1
(45) Date of Patent: May 31, 2005

(54) SYSTEM AND METHOD FOR TRANSFERRING PACKED LINGUISTIC STRUCTURES

(75) Inventors: Marc Dymetman, Grenoble (FR); Frederic Tendeau, Orleans (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/465,540

(22) Filed: Dec. 16, 1999

(51) Int. Cl.[7] .......................... G06F 17/28; G06F 17/27
(52) U.S. Cl. ............................................. 704/2; 704/9
(58) Field of Search .............................. 704/2, 3, 4–7, 704/9; 707/530, 531

(56) References Cited

U.S. PATENT DOCUMENTS 5,983,169 A    11/1999    Kozma ........................... 704/2

FOREIGN PATENT DOCUMENTS

WO    WO 97/40452    10/1997

OTHER PUBLICATIONS

Billot, Sylvie et al.. "The Structure of Shared Forests in Ambiguous Parsing," Proceedings of the 27th Meeting of the Association for Computational Linguistics, pp. 143–151.
Dörre, Jochen "Efficient Construction of Underspecified Semantics under Massive Ambiguity," Proceedings of the ACL, Madrid, Spain; 1997, pp. 386–393.
Dymetman, Marc "Charts, Interaction–Free Grammars, and the Compact Representation of Ambiguity,"IJCAI–97 Proceedings of the Fifteenth International Joint Conference on Artificial Intelligence, Nagoya, Japan; Aug. 23–29, 1997; vol. 2, pp. 1002–.

Emele, Martin C. et al. "Ambiguity Preserving Machine Translation Using Packed Representations," In Proceedings of COLING–ACL '98.

Hopcroft, John E, et al. Introduction to Automata Theory, Languages, and Computation, Addison–Weley Publishing company, 1979, pp. 77–87 and pp. 217–232.

Kay, Martin et al. Vermobil: A Translation System for Face–to–Face Dialog, CSLI Lecture Notes No. 33, 1994, pp. 79–96 and pp. 202–204.

Maxwell, John T. III et al. "An Efficient Parser for LFG," Abstract in First LFG Conference, Grenoble, France; Aug. 1996.

Maxwell, John T. III et al. "The Interface between Phrasal and Functional Constraints," Computational Linguistics, vol. 19, No. 4, Dec. 1993, pp. 571–590.

Shemtov, Hadar "Ambiguity Management in Natural Language Generation," Ph.D. Thesis, Stanford, University, Jun. 1997.

Hovy, Eduard "How MT Works," Byte, vol. 18, No. 1, Jan. 1993, pp. 167–168, 171–172, 174–176.

*Primary Examiner*—Patrick N. Edouard
(74) *Attorney, Agent, or Firm*—Oliff & Berridge, PLC

(57) ABSTRACT

The present invention provides a method and a system that utilize packed representations, i.e. structures, for performing a transfer of a collection of source representations, each of which corresponding to a meaning of a source expression in a source language, into a collection of target representations, each of which corresponding to a meaning of a target expression in a target language. A packed representation defines a corresponding collection of representations having certain subparts in common.

54 Claims, 17 Drawing Sheets

(Preferred Reading)

SYSTEM AND METHOD FOR TRANSFERRING PACKED LINGUISTIC STRUCTURES

FIELD OF THE INVENTION

The present invention relates to processing of language in a computer system. More particularly, a method and a system for the transfer of packed linguistic structures are described. The present invention is applicable in particular to automatic and semi-automatic processing of human language in translation systems, such as ambiguity-preserving translation systems, and human speech in interpreting systems including speech recognition and human-machine interfaces.

BACKGROUND OF THE INVENTION

The automation of language translation has attracted considerable interest over the last decades. This interest is fuelled by a constantly growing demand for translations as the world is growing together not only because of worldwide business activities. Machine translation addresses the problem of automated translation of human language. Although considerable progress has been made, numerous problems remain to be solved not only because of complexity of human language.

Kay, M., The proper place of men and machines in language translation, Machine Translation, Kluwer Academic Publishers, 1997, vol. 12, pages 3 to 23 discusses the opportunities of machine translation in view of linguistics, and proposes a translator's amanuensis, incorporating into a word processor some simple facilities peculiar to translation. Kay suggests that gradual enhancements of such a system could eventually lead to the original goal of machine translation. One of the major problems in linguistics remains resolving ambiguities of language. Ambiguities result from a variety of features in linguistics, one of which being prepositional attachment. Furthermore, a word may have a plurality of meanings and a plurality of functions in an expression, such as a phrase or a sentence. In addition, associations among words may be ambiguous, resulting in a plurality of meanings of an expression.

In prior art translation systems, an ambiguous input expression must be disambiguated during analysis, before further processing can continue, even if the system cannot know which meaning, i.e. reading, of a plurality of possible meanings is correct. As a consequence of an unmotivated and premature disambiguation, the correct, or most appropriate, analysis is often discarded, and the system produces a wrong translation. Some prior art systems aim to resolve this problem by generating a plurality of possible translations, and selecting one that is most likely to represent the correct translation. These systems may evaluate the plurality of possible translations, and select a translation based on some statistical properties. The selected translation may neutralize the ambiguity. However, these systems amass costs in terms of computation to be done.

SUMMARY OF THE INVENTION

The present invention has been made in consideration of the above situation, and it is the primary object of the present invention to provide an improved method and an improved system that produce more reliable translations at a reduced cost in terms of computation.

It is another object of the invention to provide a method and a system that preserve ambiguities during translation or interpretation of an expression from a first language into a second language.

It is still another object of the present invention to provide a method and a system that are applicable to the translation or interpretation of a spoken expression or a written expression. Thus, the present invention may also be applicable to optical character recognition (OCR).

It is yet another object of the invention to provide a method and a system that may be applied to other fields of computer-based linguistics processing.

A further object of the present invention is to provide a method and a system that are more readily applicable to a variety of computer systems that may be improved in terms of usability in order to simplify use of present computer systems and to facilitate the advent of computer systems with new functionality.

These and other objects of the present invention will become apparent hereinafter.

To achieve these objects, the present invention provides a method and a system that utilize packed representations, i.e. structures, for performing a transfer of a collection of source representations, each of which corresponding to a meaning of a source expression in a source language, into a collection of target representations, each of which corresponding to a meaning of a target expression in a target language. A packed representation defines a corresponding collection of representations having certain subparts in common. It is an important aspect of the present invention that the packed representation is a context-free grammar (CFG). The context-free grammar is an efficient representation of the language it generates. Each representation of the collection of representations is composed of description elements, and is considered as a word over a vocabulary of these description elements. The collection of representations can be considered as a set of such words, that is, as a language over description elements. Thus, the packed representation is a context-free grammar generating the language, that is, the set of words.

Phrase-structure grammars, also known as type-0 grammars or unrestricted grammars, are a well known family of grammars defined, for example, in Hopcroft, J. H., and Ullman, J. D., Introduction to automata theory, languages, and computation, Addison-Wesley, 1979. Phrase-structure grammars permit productions in which the input and output are both arbitrary strings of grammar symbols, and the input string is not the empty, or epsilon, string. Context-sensitive grammars are a sub-family of phrase-structure grammars in which the output string of a production must be at least as long as its input string. Context-free grammars are in turn a sub-family of context-sensitive grammars that permit productions from variables to output strings. Regular grammars are in turn a sub-family of context-free grammars in which all output strings are either right-linear, with a string of terminals preceding a variable, or left-linear, with a variable preceding a string of terminals.

The present invention utilizes an algorithm that uses a conventional set of transfer rules, and is capable of re-writing the context-free grammar representing the packed source representation into a context-free grammar representing a packed target representation and preserving factorization properties and compactness of the source context-free grammar. The representations may be considered as graphs composed of nodes, links and labels. The transfer rules can be of arbitrary complexity.

In a first embodiment, the present invention provides an ambiguity-preserving method, for use in a computer system, for transforming a first expression in a first language into a second expression in a second language wherein a first packed representation of the first expression is transferred into a second packed representation of the second expression using transfer rules, each of which defining, for a first combination of one or more elements occurring in the first packed representation, a way to re-write the first combination to obtain a second combination of one or more elements occurring in the second packed representation; the first packed representation being a phrase-structure grammar defining one or more representations of the first expression; the second packed representation being a phrase-structure grammar defining one or more representations of the second expression; the set of transfer rules including at least one rule in which the first combination or the second combination includes more than one element.

In one aspect, the first embodiment provides a method wherein the transfer rules are iteratively applied to the first packed representation and resulting intermediate representations. In another aspect, the first embodiment provides a method wherein the phrase-structure grammars are context-free grammars. In yet another aspect, the first embodiment provides a method wherein each representation is composed of at least some elements of the types predicate name, argument and modifier. In a further aspect, the first embodiment provides a method wherein each representation corresponds with a graph being composed of nodes, links and labels. According to another aspect, the first embodiment also provides a method wherein each representation is commutative, such that its elements are permutable. Furthermore, the first embodiment provides a method in accordance with yet another aspect wherein the method comprises obtaining a first plurality of representations from the first expression, each representation defining one of a first plurality of meanings in the first language; obtaining the first packed representation from the first plurality of representations; and generating the second packed representation from the first packed representation. The first embodiment further provides a method in accordance with an aspect wherein the method comprises obtaining a second plurality of representations from the second packed representation, each representation defining one of a second plurality of meanings in the second language. In two further aspects, the first embodiment is directed to methods wherein the first expression is spoken text, or the first expression is written text. The first embodiment also provides a method wherein the second language is machine-compatible.

In the first embodiment, the present invention further provides an ambiguity-preserving system, for use in a computer system, for transforming a first expression in a first language into a second expression in a second language wherein a first packed representation of the first expression is transferred into a second packed representation of the second expression using transfer rules, each of which defining, for a first combination of one or more elements occurring in the first packed representation, a way to re-write the first combination to obtain a second combination of one or more elements occurring in the second packed representation; the first packed representation being a phrase-structure grammar defining one or more representations of the first expression; the second packed representation being a phrase-structure grammar defining one or more representations of the second expression; the set of transfer rules including at least one rule in which the first combination or the second combination includes more than one element. The system of the first embodiment may further comprise aspects of the corresponding method.

Furthermore, the first embodiment of the present invention provides a computer program product, for use in a computer system, for transforming a first expression in a first language into a second expression in a second language wherein a first packed representation of the first expression is transferred into a second packed representation of the second expression using transfer rules, each of which defining, for a first combination of one or more elements occurring in the first packed representation, a way to re-write the first combination to obtain a second combination of one or more elements occurring in the second packed representation; the first packed representation being a phrase-structure grammar defining one or more representations of the first expression; the second packed representation being a phrase-structure grammar defining one or more representations of the second expression; the set of transfer rules including at least one rule in which the first combination or the second combination includes more than one element. In another aspect, the second embodiment provides a computer program product comprising a computer-readable medium for storing the instructions for causing the transforming. Lastly, the computer program product of the first embodiment may further comprise aspects of the corresponding method.

In a second embodiment, the present invention provides an ambiguity-preserving method, for use in a computer system, for performing a transfer of a collection of source graphs sharing certain subparts into a collection of target graphs, each source graph being a word over a source vocabulary of description elements, the description elements comprising nodes, links and labels, the collection of source graphs being a source language over the source vocabulary, each target graph being a word over a target vocabulary of description elements, the collection of target graphs being a target language over the target vocabulary, wherein the method comprises obtaining a packed source structure representing the collection of source graphs, the packed source structure being a context-free source grammar defining the source language; and generating a packed target structure from the packed source structure, the packed target structure being a context-free target grammar defining the target language; and where the transfer is done using transfer rules, each of which defining, for a first combination of one or more elements occurring in the collection of source graphs, a way to re-write the first combination to obtain a second combination of one or more elements occurring in the collection of target graphs; the set of transfer rules including at least one rule in which the first combination or the second combination includes more than one element.

In one aspect, the second embodiment provides a method further comprising obtaining the collection of target graphs from the packed target structure. In another aspect, the second embodiment provides a method wherein the step of generating comprises applying transfer rules to the packed source structure for obtaining the packed target structure. In yet another aspect, the second embodiment provides a method wherein the transfer rules are iteratively applied. In a further aspect, the second embodiment provides a method wherein the transfer rules are recursively applied. According to another aspect, the second embodiment also provides a method wherein the target grammar preserves factorization properties and compactness of the source grammar. Furthermore, the second embodiment provides a method in accordance with yet another aspect wherein each grammar is commutative, such that its description elements are permutable. The second embodiment provides a method in accordance with a further aspect wherein each grammar comprises a collection of rules, each rule having a left-hand side and a right-hand side, each right-hand side being composed of at least some elements of the types description element and left-hand side of other rules. The second embodiment also provides a method wherein each source graph corresponds with a meaning of an expression in a first language.

In the second embodiment, the present invention further provides an ambiguity-preserving system, for use in a computer system, for performing a transfer of a collection of source graphs sharing certain subparts into a collection of target graphs, each source graph being a word over a source vocabulary of description elements, the description elements comprising nodes, links and labels, the collection of source graphs being a source language over the source vocabulary, each target graph being a word over a target vocabulary of description elements, the collection of target graphs being a target language over the target vocabulary, wherein the system comprises means for obtaining a packed source structure representing the collection of source graphs, the packed source structure being a context-free source grammar defining the source language; and means for generating a packed target structure from the packed source structure, the packed target structure being a context-free target grammar defining the target language; and where the transfer is done using transfer rules, each of which defining, for a first combination of one or more elements occurring in the collection of source graphs, a way to re-write the first combination to obtain a second combination of one or more elements occurring in the collection of target graphs; the set of transfer rules including at least one rule in which the first combination or the second combination includes more than one element. The system of the second embodiment may further comprise aspects of the corresponding method.

Furthermore, the second embodiment of the present invention provides a computer program product, for use in a computer system, for performing a transfer of a collection of source graphs sharing certain subparts into a collection of target graphs, each source graph being a word over a source vocabulary of description elements, the description elements comprising nodes, links and labels, the collection of source graphs being a source language over the source vocabulary, each target graph being a word over a target vocabulary of description elements, the collection of target graphs being a target language over the target vocabulary, wherein the product comprises instructions for obtaining a packed source structure representing the collection of source graphs, the packed source structure being a context-free source grammar defining the source language; and generating a packed target structure from the packed source structure, the packed target structure being a context-free target grammar defining the target language; and where the transfer is done using transfer rules, each of which defining, for a first combination of one or more elements occurring in the collection of source graphs, a way to re-write the first combination to obtain a second combination of one or more elements occurring in the collection of target graphs; the set of transfer rules including at least one rule in which the first combination or the second combination includes more than one element. In another aspect, the second embodiment provides a computer program product comprising a computer-readable medium for storing the instructions. Lastly, the computer program product of the second embodiment may further comprise aspects of the corresponding method.

In a third embodiment, the present invention provides an ambiguity-preserving method, for use in a computer system, for performing a transfer of a collection of source representations having at least some portions in common into a collection of target representations, each source representation being a word over a source vocabulary of description elements, the collection of source representations being a source language over the source vocabulary, each target representation being a word over a target vocabulary of description elements, the collection of target representations being a target language over the target vocabulary, wherein the method comprises obtaining a packed source structure representing the collection of source representations, the packed source structure being a context-free source grammar defining the source language; and generating a packed target structure from the packed source structure, the packed target structure being a context-free target grammar defining the target language; and where the transfer is done using transfer rules, each of which defining, for a first combination of one or more elements occurring in the collection of source representations, a way to re-write the first combination to obtain a second combination of one or more elements occurring in the collection of target representations; the set of transfer rules including at least one rule in which the first combination or the second combination includes more than one element.

In one aspect, the third embodiment provides a method further comprising obtaining the collection of target representations from the packed target structure. In another aspect, the third embodiment provides a method wherein the step of generating comprises applying transfer rules to the packed source structure for obtaining the packed target structure. In yet another aspect, the third embodiment provides a method wherein the transfer rules are iteratively applied. In a further aspect, the third embodiment provides a method wherein the transfer rules are recursively applied. According to another aspect, the second embodiment also provides a method wherein the target grammar preserves factorization properties and compactness of the source grammar. Furthermore, the third embodiment provides a method in accordance with yet another aspect wherein each grammar is commutative, such that its description elements are permutable. The third embodiment provides a method in accordance with a further aspect wherein each grammar comprises a collection of rules, each rule having a left-hand side and a right-hand side, each right-hand side being composed of at least some elements of the types description element and left-hand side of other rules. The third embodiment also provides a method each source representation corresponds with a meaning of an expression in a first language. The third embodiment also provides a method wherein each representation corresponds with a graph being composed of nodes, links and labels.

In the third embodiment, the present invention further provides an ambiguity-preserving system, for use in a computer system, for performing a transfer of a collection of source representations having at least some portions in common into a collection of target representations, each source representation being a word over a source vocabulary of description elements, the collection of source representations being a source language over the source vocabulary, each target representation being a word over a target vocabulary of description elements, the collection of target representations being a target language over the target vocabulary, wherein the system comprises means for obtaining a packed source structure representing the collection of source representations, the packed source structure being a context-free source grammar defining the source language; and means for generating a packed target structure from the packed source structure, the packed target structure being a context-free target grammar defining the target language;

and where the transfer is done using transfer rules, each of which defining, for a first combination of one or more elements occurring in the collection of source representations, a way to re-write the first combination to obtain a second combination of one or more elements occurring in the collection of target representations; the set of transfer rules including at least one rule in which the first combination or the second combination includes more than one element. The system of the third embodiment may further comprise aspects of the corresponding method.

Furthermore, the third embodiment of the present invention provides a computer program product, for use in a computer system, for performing a transfer of a collection of source representations having at least some portions in common into a collection of target representations, each source representation being a word over a source vocabulary of description elements, the collection of source representations being a source language over the source vocabulary, each target representation being a word over a target vocabulary of description elements, the collection of target representations being a target language over the target vocabulary, wherein the product comprises instructions for obtaining a packed source structure representing the collection of source representations, the packed source structure being a context-free source grammar defining the source language; and generating a packed target structure from the packed source structure, the packed target structure being a context-free target grammar defining the target language; and where the transfer is done using transfer rules, each of which defining, for a first combination of one or more elements occurring in the collection of source representations, a way to re-write the first combination to obtain a second combination of one or more elements occurring in the collection of target representations; the set of transfer rules including at least one rule in which the first combination or the second combination includes more than one element. In another aspect, the third embodiment provides a computer program product comprising a computer-readable medium for storing the instructions. Lastly, the computer program product of the third embodiment may further comprise aspects of the corresponding method.

As those skilled in the art will appreciate, an aspect or aspects of a particular embodiment may be combined with an aspect or aspects of another embodiment.

BRIEF DESCRIPTION OF THE DRAWINGS

The accompanying drawings are incorporated into and form a part of the specification to illustrate several examples of the present invention. These drawings together with the description serve to explain the principles of the invention. The drawings are only for the purpose of illustrating preferred and alternative examples of how the invention can be made and used and are not to be construed as limiting the inventions to only the illustrated and described examples. Further features and advantages will become apparent from the following and more particular description of the various embodiments of the invention, as illustrated in the accompanying drawings wherein.

DETAILED DESCRIPTION OF THE INVENTION

The illustrative embodiments of the present invention will be described with reference to the drawings.

Figure 2:
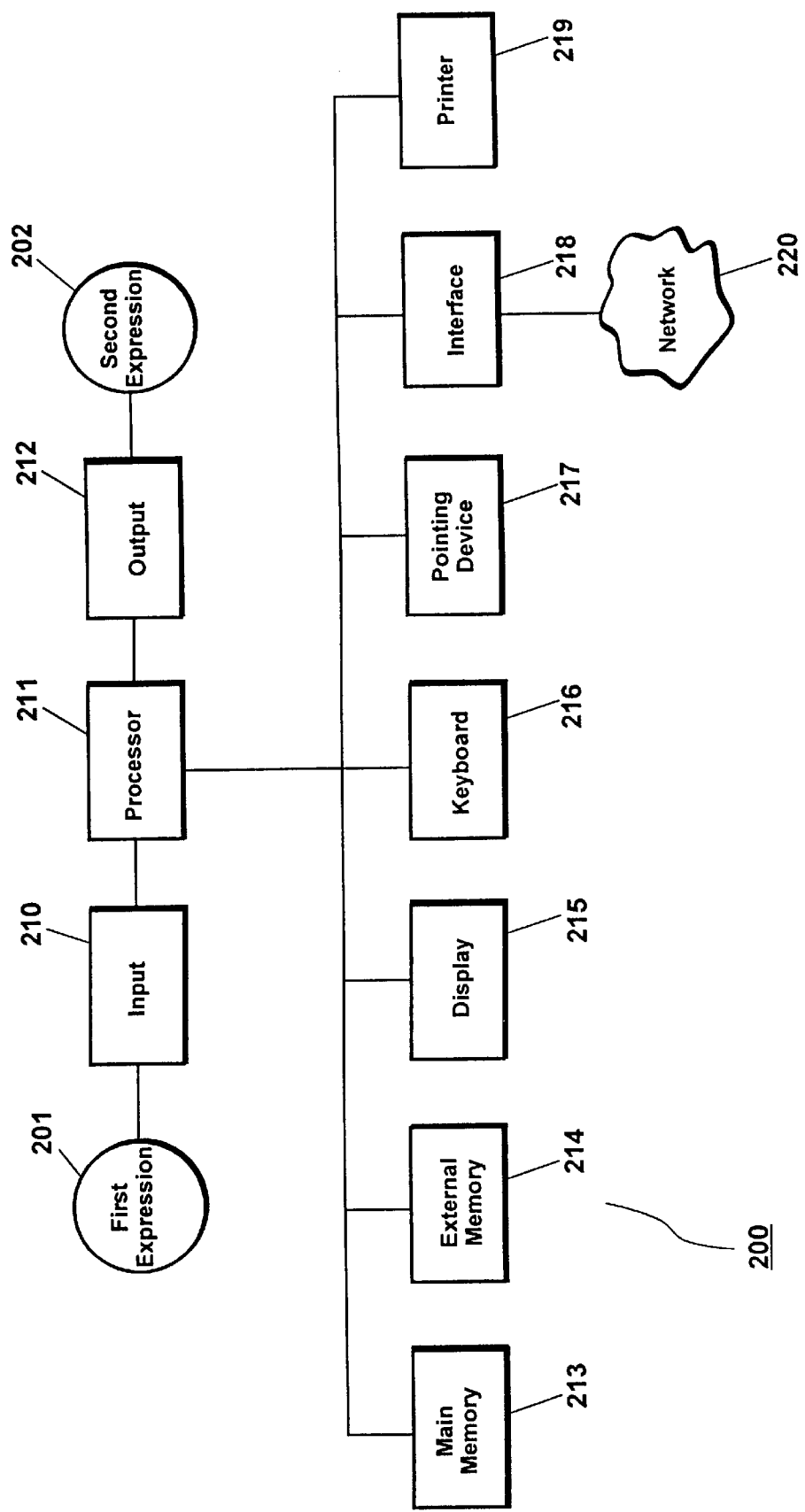
FIG. 2 illustrates a schematic diagram of the computer system according to the present invention.

As illustrated in FIG. 2, the computer system 200 according to the present invention comprises an input 210 for receiving a first expression 201, such as a phrase or sentence, a processor 211 connected to the input 210 for performing the inventive method of transferring the first expression 201 into a second expression 202, and an output 212 connected to the processor 211 for outputting the second expression 202, such as phrase or sentence. The computer system 200 transforms, i.e. translates or interprets, the first expression 201 in a first language into the second expression 202 in a second language. The first expression 201 may be provided to the computer system 200 as spoken text, written text or the like. Consequently, the input 210 comprises means for converting the first expression 201 into data for processing. For written text, the input 210 may comprise optical input means, such as a scanner. For spoken text, the input 210 may comprise an audio transducer, such a microphone, and an analog-to-digital converter (ADC) for converting an analog signal produced by the transducer into digital data. However, the first expression 201 may also be provided as digital data stored on a computer-readable medium, such as a floppy disk, or received via a computer network. For written text, the output 212 may comprise a printing means. For spoken text, the output 212 may comprise a digital-to-analog converter (DAC) for converting digital data into an analog signal, an amplifier for amplifying the analog signal, and an output transducer, such as a speaker or headphone, for outputting an acoustic signal. However, the second expression 202 may also be stored onto a computer-readable medium or sent via the computer network. While the first language and the second language are usually languages understood by humans, such as English, German and French, the second language may also be a computer-compatible language for embodiments of the present invention wherein the invention is utilized for a human-machine interface.

As those skilled in the art will appreciate, the computer system 200 preferably comprises main memory 213 for storing program code, such as an operating and application programs, and data. The computer system 200 preferably further comprises external memory 214, such as a hard-disk drive and floppy-disk drive, for storing the program code and data more permanently. The computer 200 may further comprise a display 215, a keyboard 216 and a pointing device 217, such as a computer mouse, for interaction with a user. The user interaction may be required for semi-automatic operation of the computer system 200, and may also be utilized for the output 212 and the input 210, respectively. The computer system 200 may also comprise an interface 218 for connecting the computer system 200 to a network 220, such as a local area network (LAN), the Internet or a telephone network that may be wireless. The computer system 200 may further comprise a printer 219, such as an ink printer, laser printer, or impact printer including devices for outputting Braille.

Figure 3:
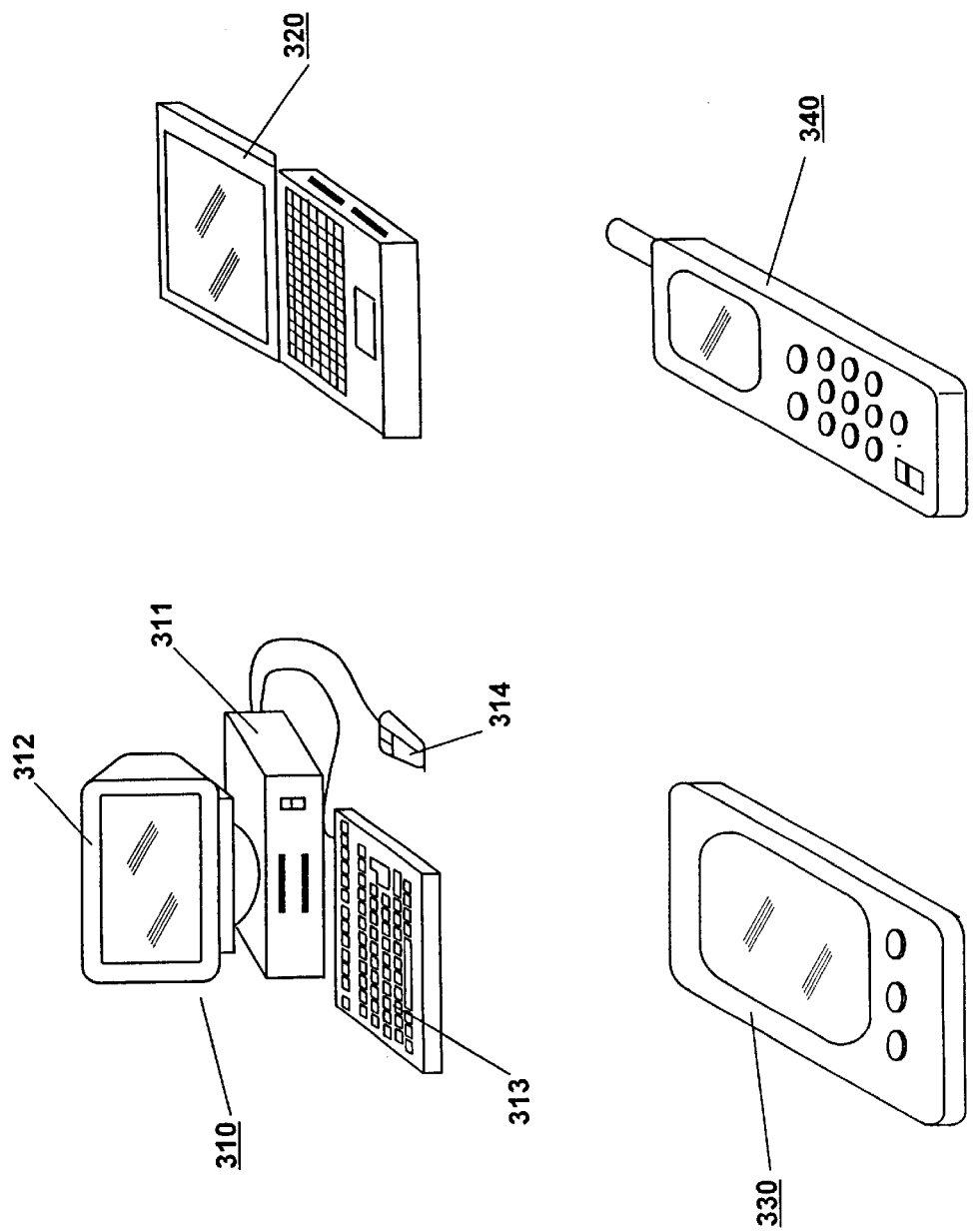
FIG. 3 illustrates a selection of embodiments of the computer system according to the present invention.

FIG. 3 illustrates a selection of computer systems 310, 320, 330 and 340 that may be utilized for performing the inventive method. The inventive method may be performed on a computer system 310 resembling a conventional desktop computer or workstation comprising a main unit 311, a display 312, a keyboard 313 and a mouse 314. Alternatively, the computer system may resemble a laptop computer 320, notebook computer, palmtop computer or the like. The computer system may also resemble a hand-holdable personal digital assistant (PDA) 330 that combines computing, telephone, telefax and networking features. However, the computer system may also be implemented into other electronic devices, such as a mobile phone 340. The user could activate the mobile phone 340 to interpret an expression originating from an interlocutor in the interlocutor's language into an expression in the user's language or vice versa.

As those skilled in the art will appreciate, the application of the method and the system according to the present invention is not limited to the selection of computer systems illustrated in FIG. 3.

Figure 1:
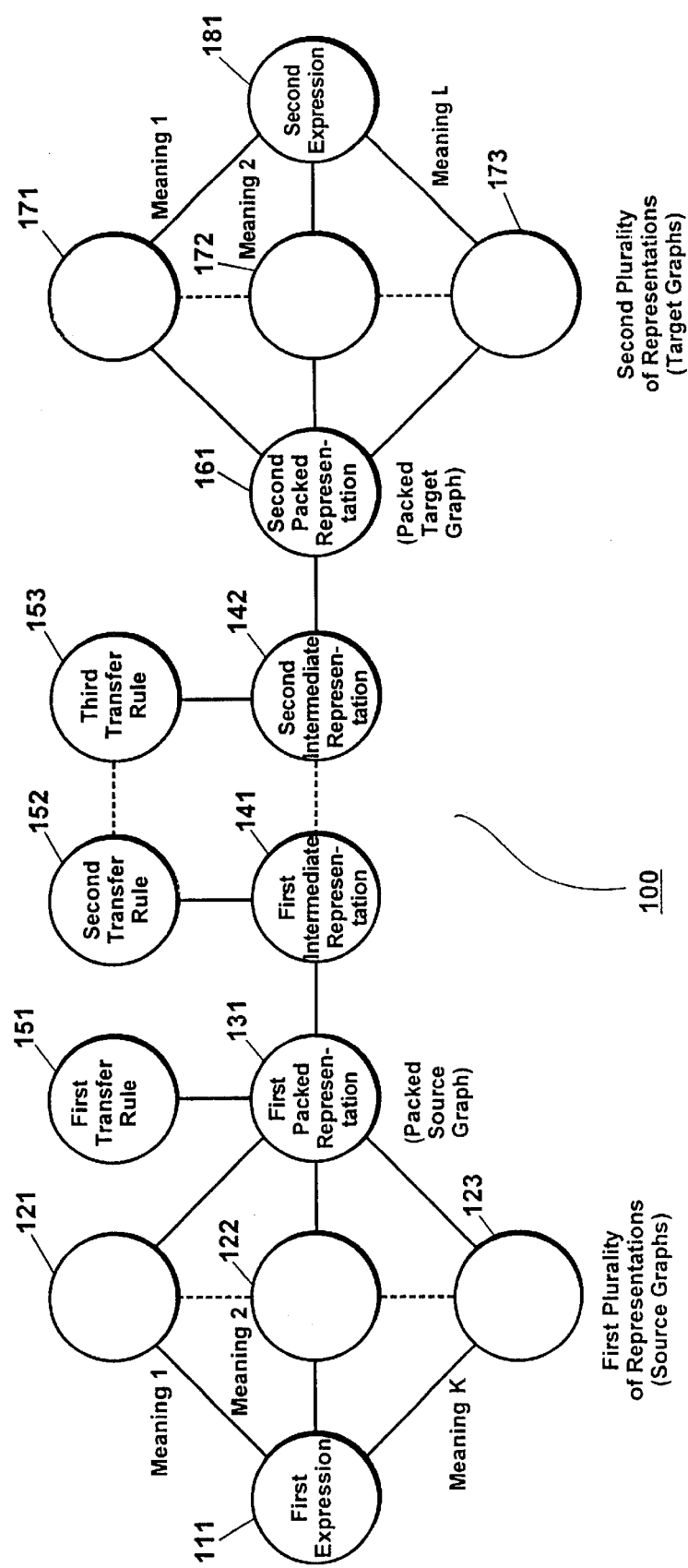
FIG. 1 illustrates a schematic diagram of the method according to the present invention.

FIG. 1 illustrates a schematic diagram of the method 100 according to the present invention. The method 100 may be performed in a variety of computer systems 200 including the selection of computer systems 310, 320, 330 and 340 shown in FIG. 3. The method 100 transforms, i.e. translates or interprets, a first expression 111 in a first language, provided in a written, spoken or other form, into a second expression 181 in a second language, provided in a written, spoken or other form. The first expression 111 comprises a plurality of words in the first language. As the structure of the expression 111 and the meaning of the words are ambiguous because of certain features of the first language, the first expression 111 may be read and understood with a plurality of meanings. Hence, a first plurality of representations 121, 122 and 123, each of which defining one of the first plurality of meanings, is obtained from the first expression 111. Each representation may be described using a set of description elements and represented using a graphical representation, such as a graph. As the first plurality of representations 121, 122 and 123 are derived from one expression 111, the representations of the first plurality of representations 121, 122 and 123 share certain subparts. Thus, a first packed representations 131 is generated from the first plurality of representations 121, 122 and 123. Packing results from the fact that the packed representation 131 is more efficient representation of the first plurality of representations 121, 122 and 123. While each representation of the first plurality of representations 121, 122 and 123 comprises a collection of description elements describing the corresponding representation, the packed representation 131 may be considered as a first context-free grammar (CFG) that defines and generates a plurality of collections of description elements, that corresponds with the first plurality of representations 121, 122 and 123. The first packed representation 131 is then transformed into a second packed representation 161 using a set of transfer rules 151, 152 and 153 that may be iteratively and recursively applied to the packed representations. The set of transfer rules 151, 152 and 153 defines the transfer of description elements of the first packed representation 131 into description elements of the second packed representation 161. The first transfer rule 151 may be applied to the first packed representation 131 to produce a first intermediate representation 141. A second transfer rule 152 may be applied to the first intermediate representation 141 to produce a further intermediate representation, until a third transfer rule 153 is applied to a second intermediate representation 142 to produce the second packed representation 161. Similarly to the first packed representation 131, the second packed representation 161 represents and generates a second plurality of representations 171, 172 and 173. Each of the second plurality of representations 171, 172 and 173 represents a meaning. From the second plurality of representations 171, 172 and 173 one or more appropriate representations may be selected to obtain the second expression 181 in the second language.

As those skilled in the art will appreciate, the method according to the invention performs a transfer of a source grammar defining a plurality of collections of source elements into a target grammar defining a plurality of collections of target elements, instead of directly performing a transfer of a collection of source elements into a collection of target elements or a plurality of collections of source elements into a plurality of collections of target elements.

The description of the principles of the present invention is followed by a detailed description of the preferred embodiment together with an illustrative example with reference to FIGS. 4 to 29.

The present invention utilizes an algorithm for re-writing packed structures, that is, finite pluralities of labelled graphs sharing certain subparts. A labelled graph is seen as a word over a vocabulary of description elements, such as nodes, arcs and labels, and a plurality of graphs is seen as a set as such words, that is, as a language over these description elements. A packed representation for the plurality of graphs is then viewed as a context-free grammar which generates such a language. Packing results from the fact that a context-free grammar is an efficient representation for a language it generates. Starting from a finite set of re-write patterns, i.e. a transfer lexicon, the algorithm associates with a given context-free grammar representing the source packed structure a context-free grammar representing the target packed structure. The algorithm has the property that, under certain natural "locality" conditions, the target grammar preserves the factorization properties and the compactness of the source grammar.

Figure 28:
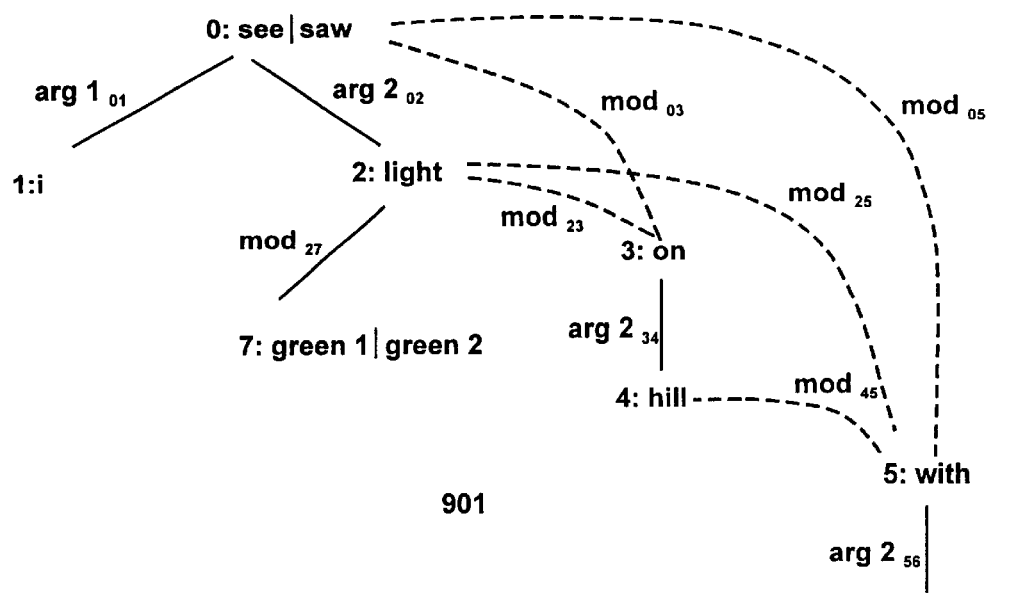
FIG. 28 illustrates a packed source graph of the example.

As an illustrative example, the English sentence "I saw a green light on the hill with a telescope" is transformed into French. The sentence may be read and understood in a plurality of different ways. FIGS. 8 to 27 illustrate the plurality of source graphs 801 to 820, each of which corresponding to a different possible reading of the source sentence. The plurality of source graphs 801 to 820 informally represents the set of possible analysis for this sentence. Similarly, FIG. 28 illustrates a packed source representation 901 comprising each of the plurality of source graphs 801 to 820. Every graph 801 to 820 and 901 comprises nodes with labels corresponding to predicate names, such as "see", "saw", "I", "light" and so on. In FIG. 28, a vertical slash indicates different possible readings for a node; for example, the surface form "saw" can correspond to the verbs "to see" or "to saw", and "green" is ambiguous between the color adjective "green1" and the noun "green2", i.e. grassy lawn. Relations between nodes are indicated by labels on the links joining two nodes. The labels "arg1" and "arg2" represent a first and second argument, respectively, and the label "mod" represents a modifier. The solid links correspond to relations that are satisfied in the reading of a source graph 801 to 820. In FIG. 28, the solid links correspond to relations that are satisfied in all readings of the sentence, and dotted links correspond to relations that are satisfied only for certain readings. Thus, the prepositional phrase "on the hill" can modify either "light" or "see|saw", and the phrase "with a telescope" can modify "hill", "light" or "see|saw". The packed source graph illustrated in FIG. 28 does not make exactly explicit which graphs are actually possible analyses of the sentence. For example, the two crossing links labelled $mod_{03}$ and $mod_{25}$ cannot appear in one reading of the sentence. It should be noted that the indices are used to denote the origin and destination of a link. As a consequence, only five of the apparent 2×3 prepositional attachment combinations are possible. As can be seen from FIG. 28, the five prepositional attachment combinations multiplied by the two possible lexical variants for "saw" multiplied by the two lexical variants for "green" results in 20 possible readings for the sentence.

Figure 8:
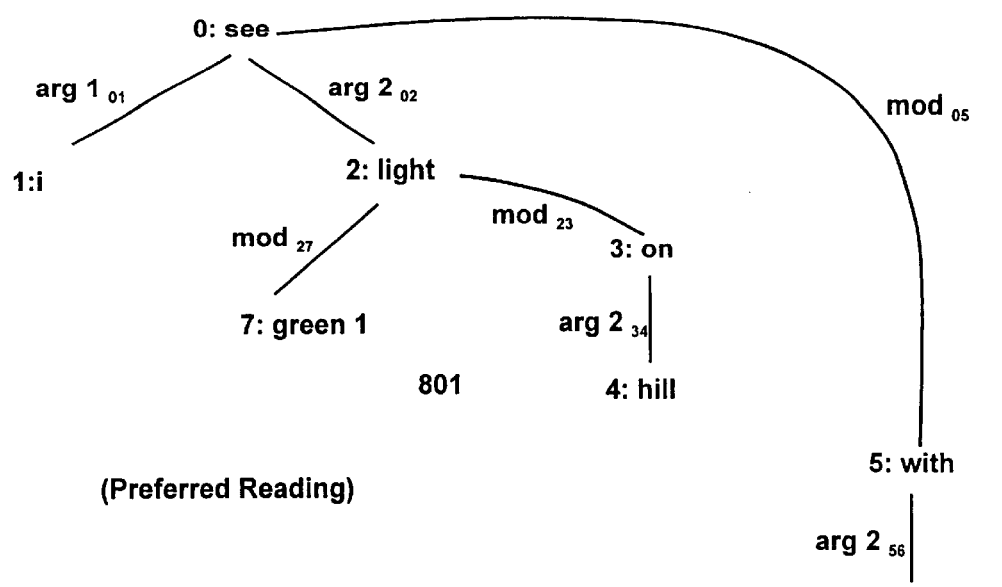
FIGS. 8 to 27 illustrate a plurality of source graphs of a particular example.
Figure 9:
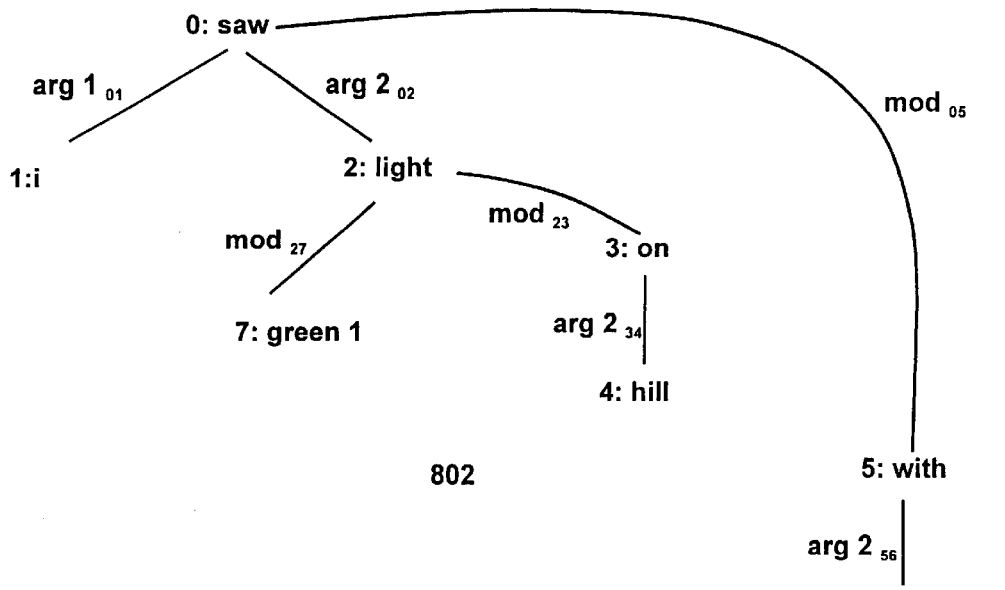
Figure 10:
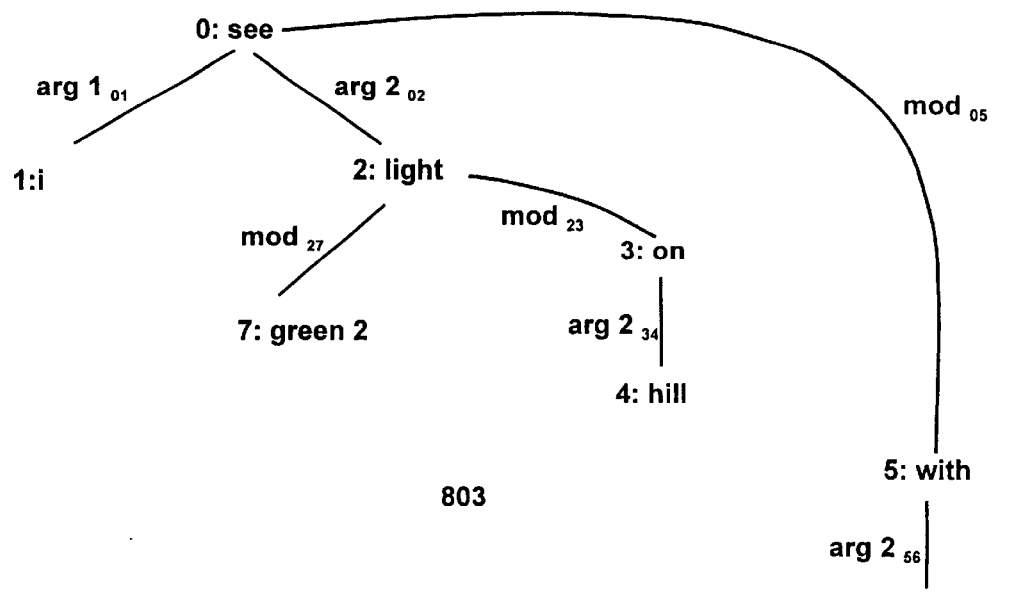
Figure 11:
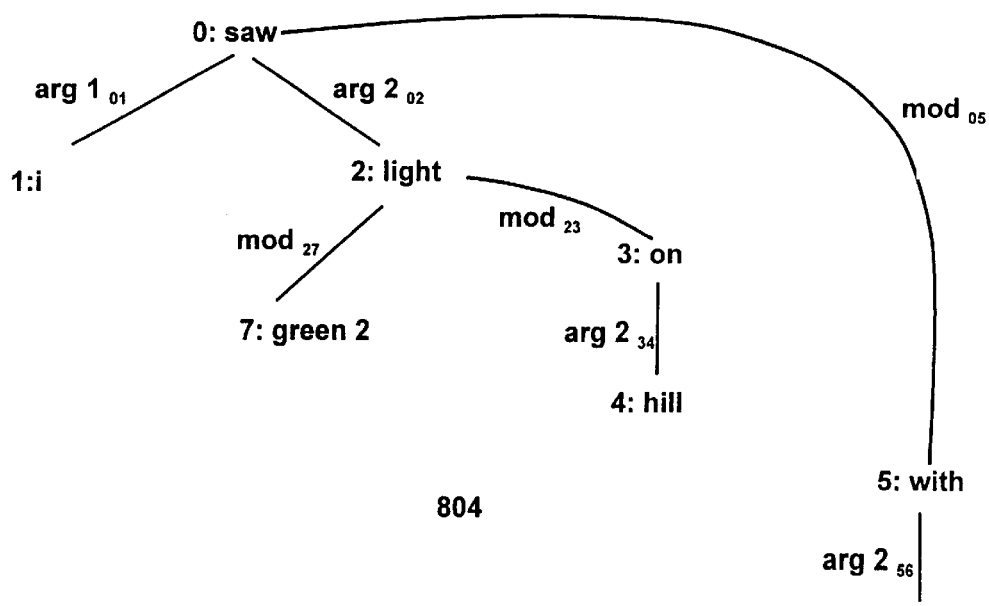
Figure 12:
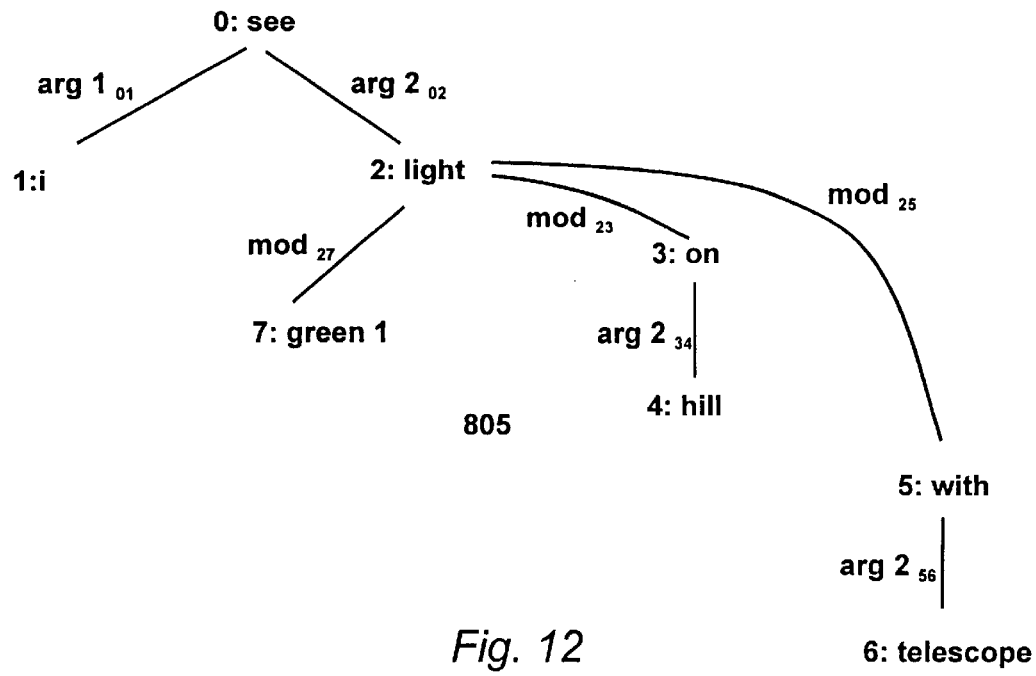
Figure 13:
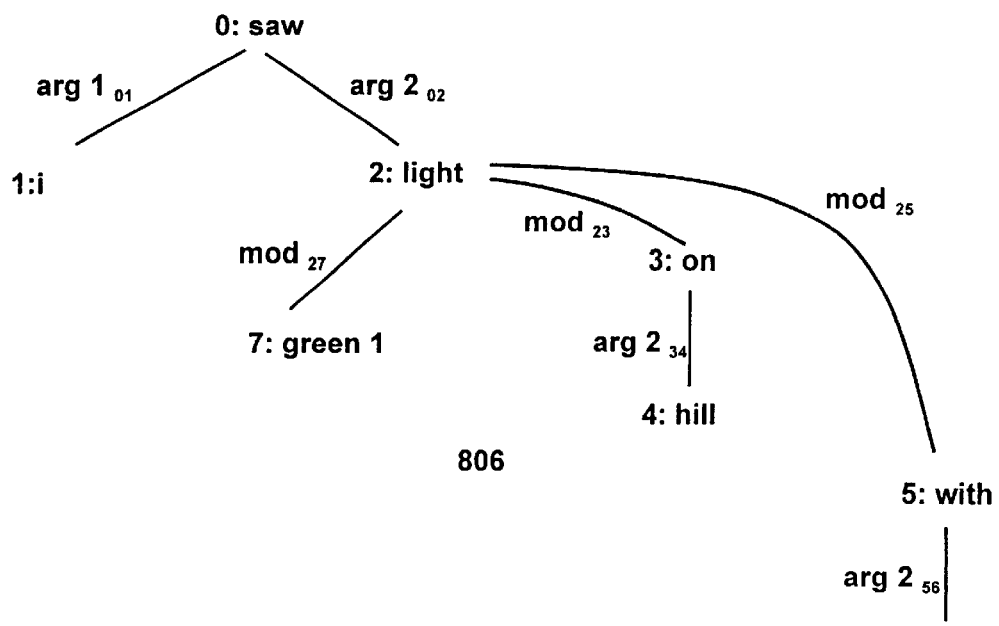
Figure 14:
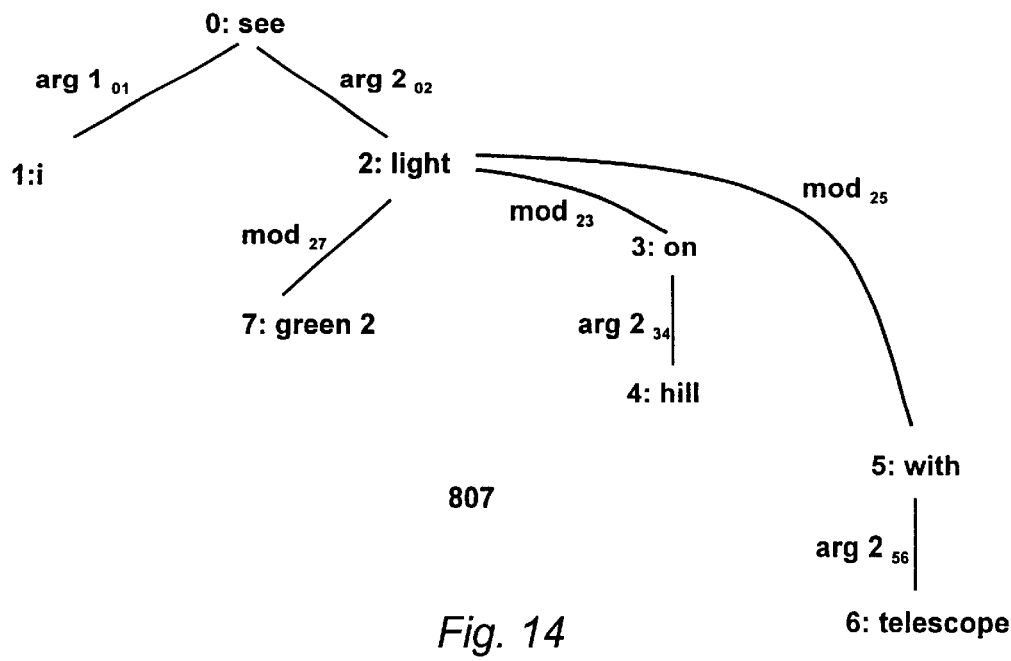
Figure 15:
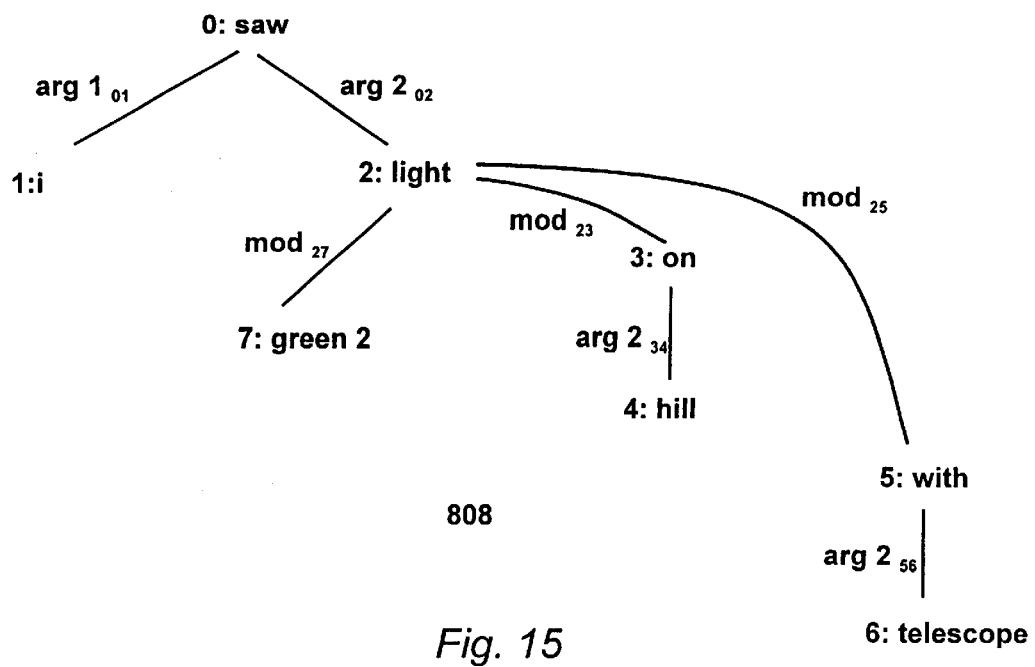
Figure 16:
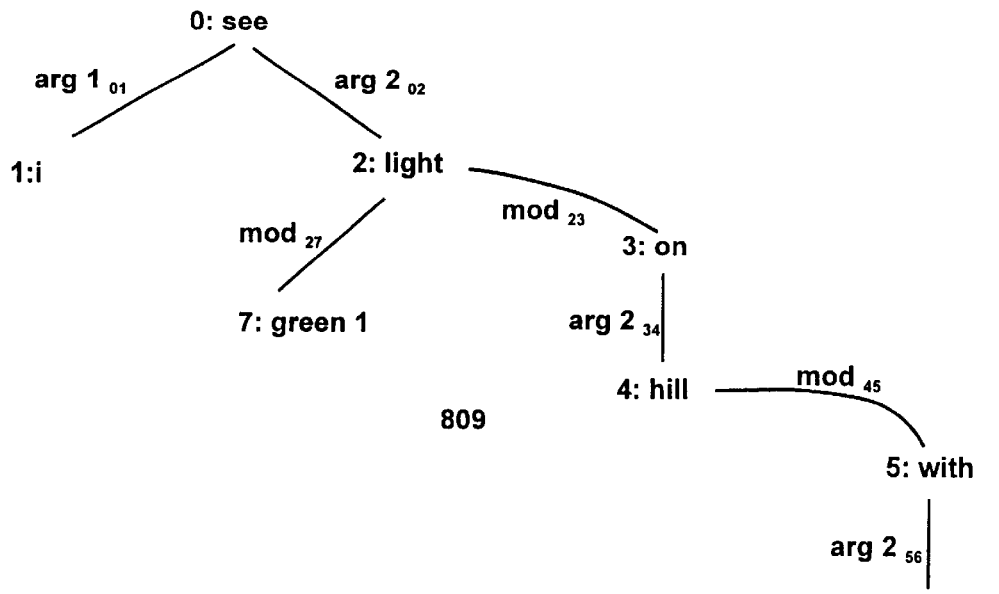
Figure 17:
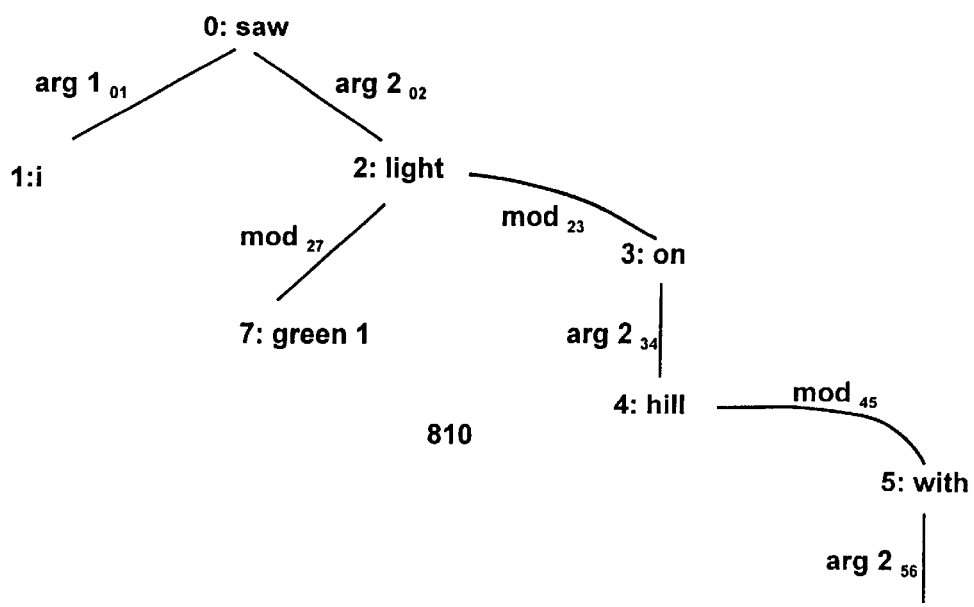
Figure 18:
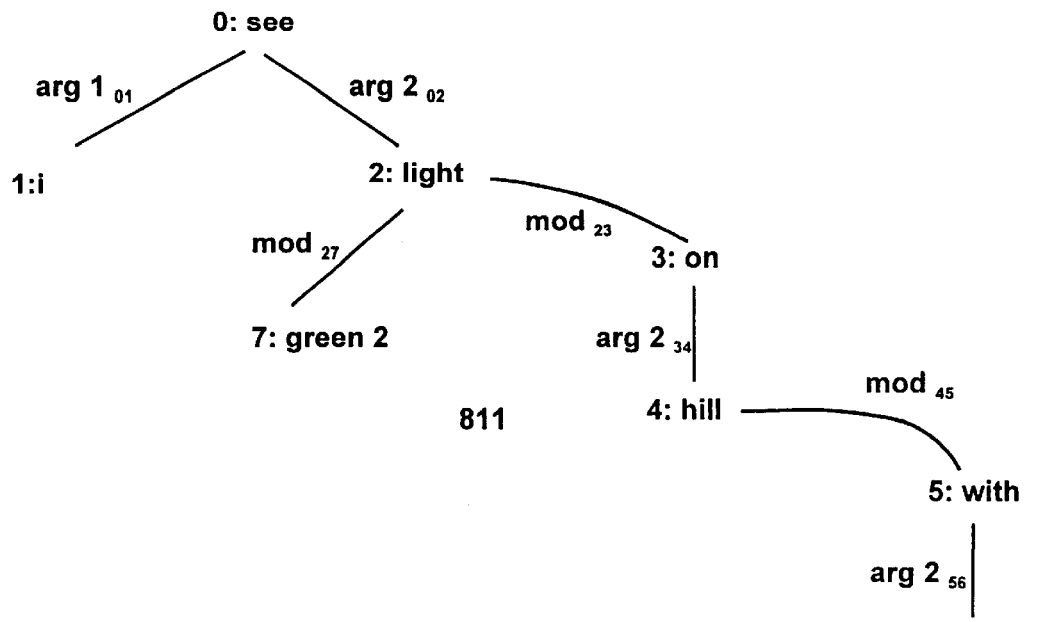
Figure 19:
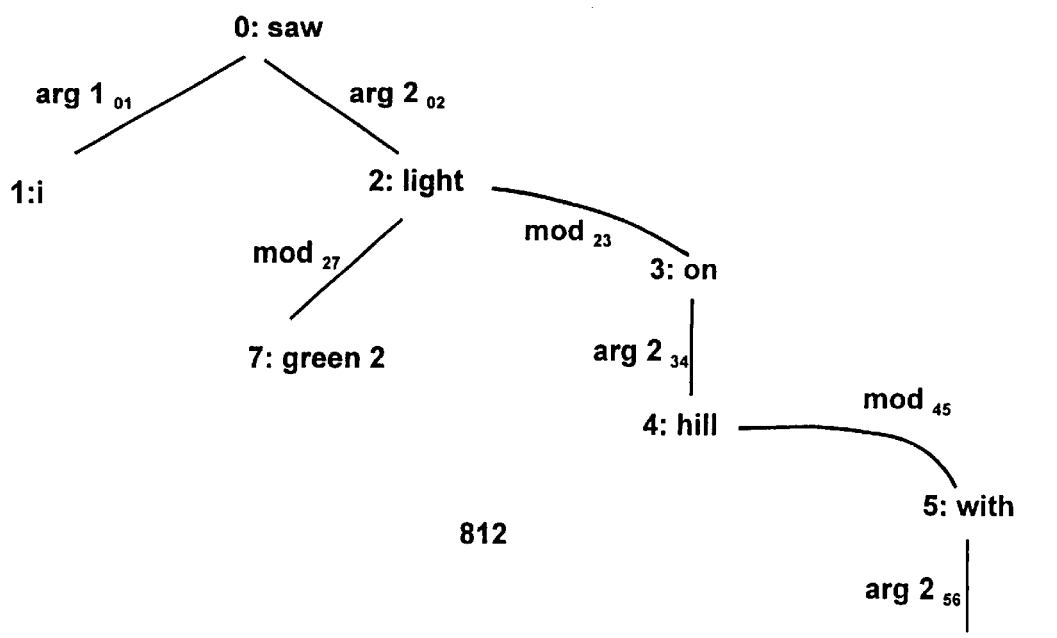
Figure 20:
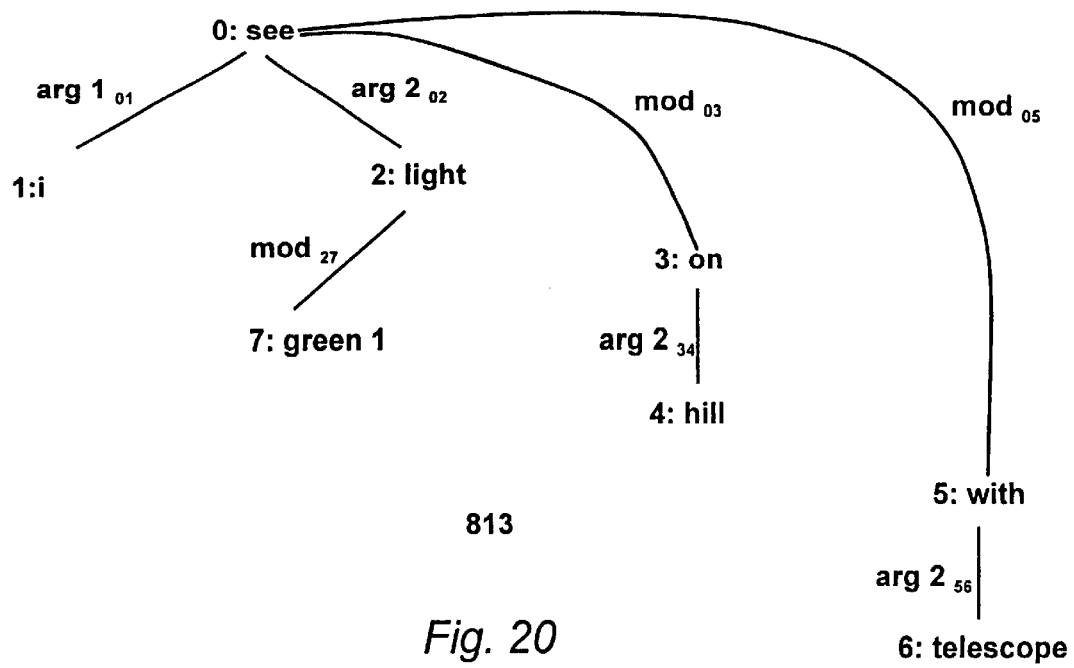
Figure 21:
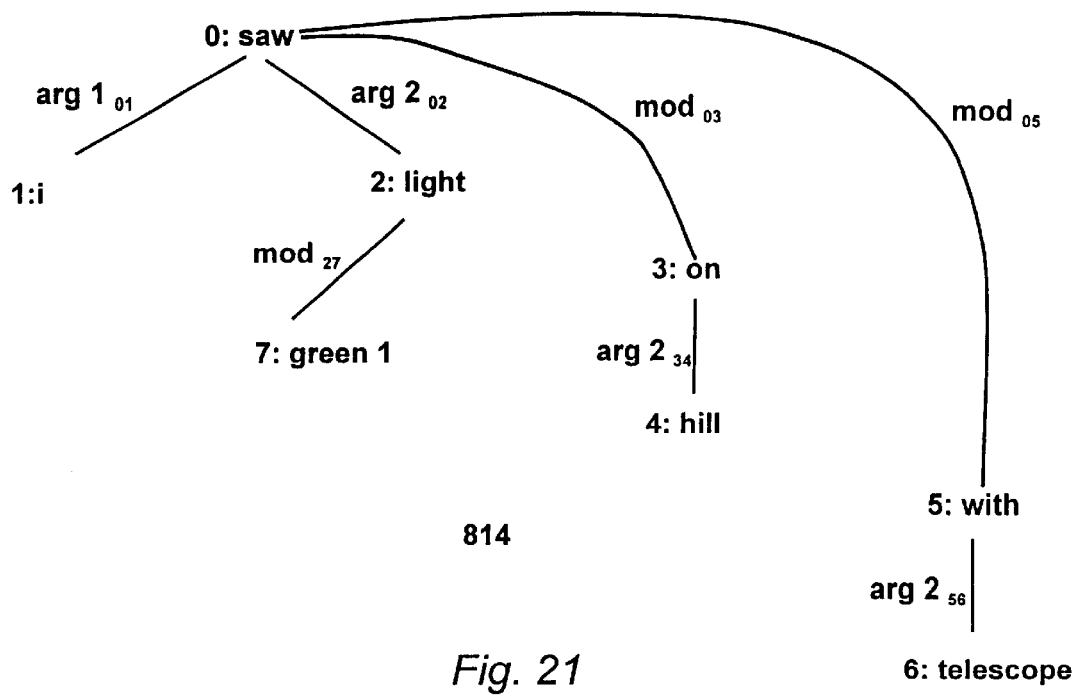
Figure 22:
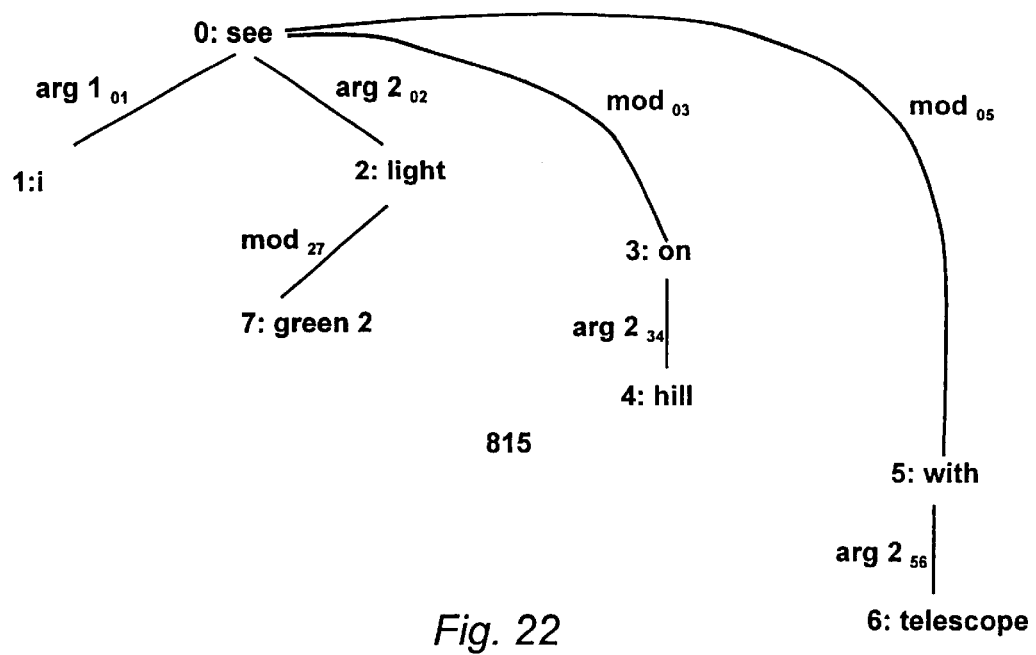
Figure 23:
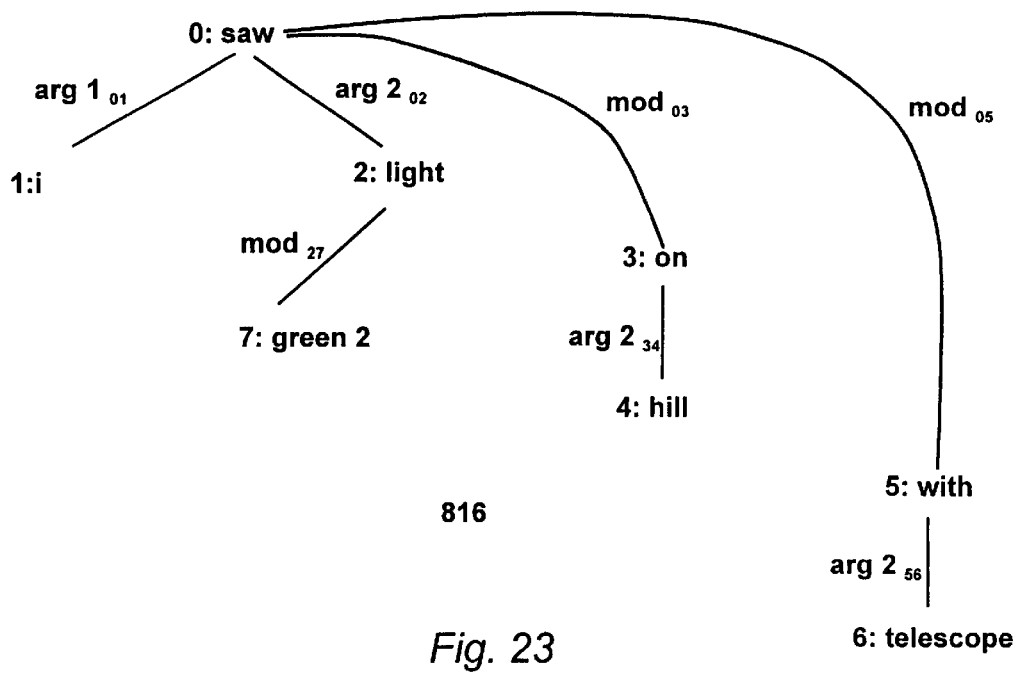
Figure 24:
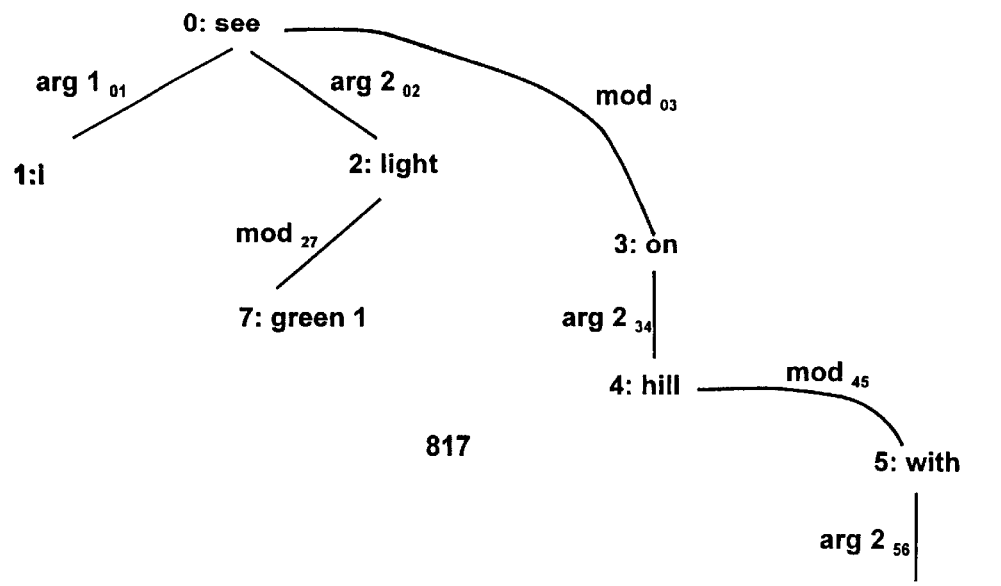
Figure 25:
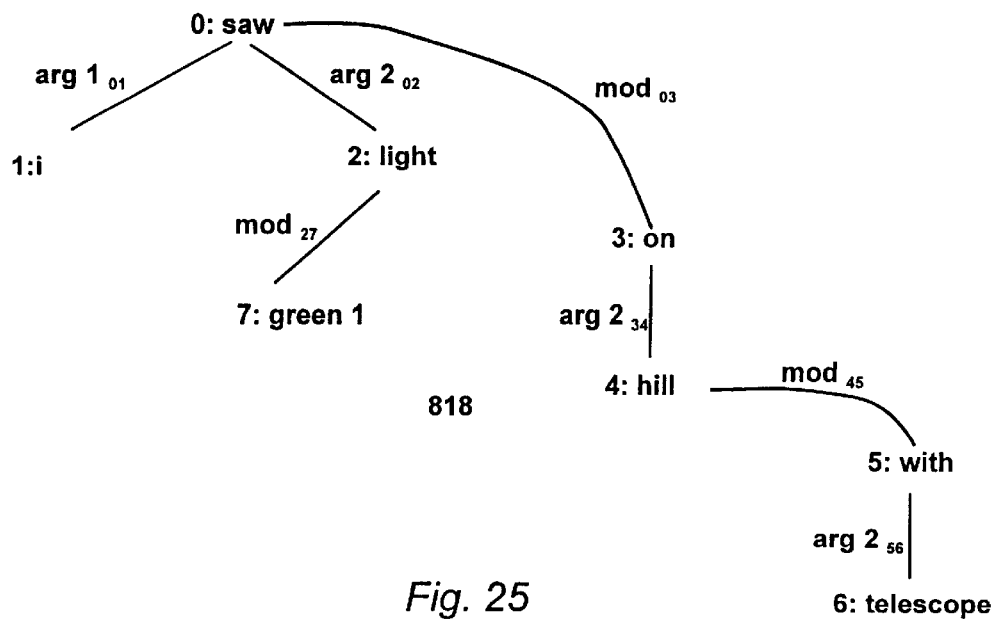
Figure 26:
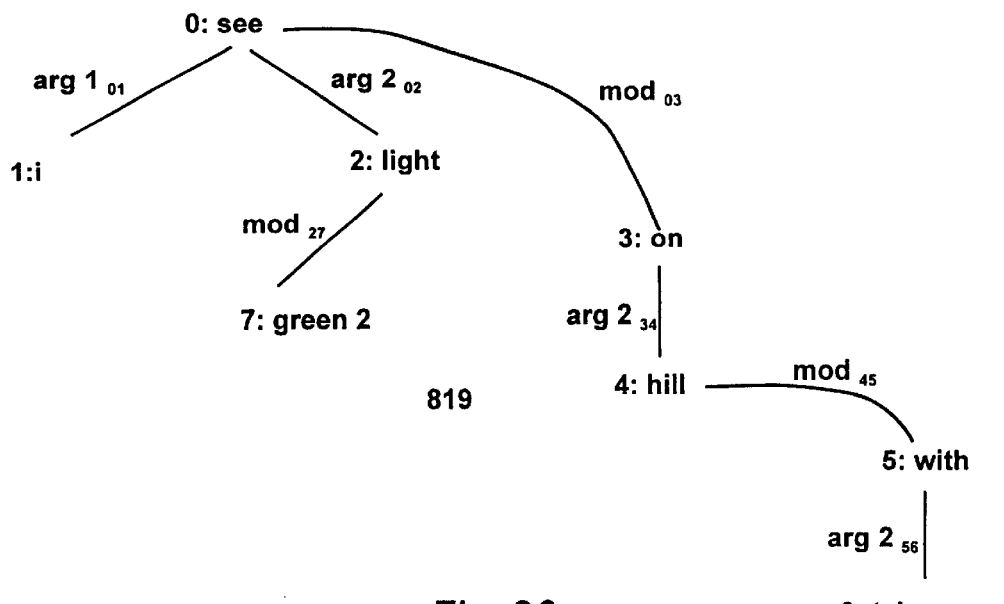
Figure 27:
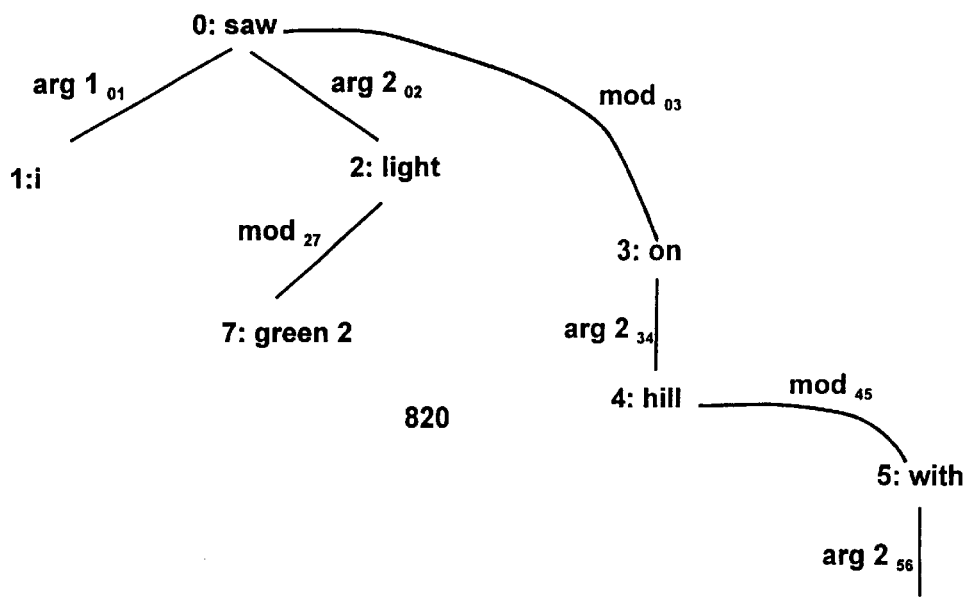

FIGS. 8 to 27 illustrate these 20 possible readings. Each of these readings is a graph 801 to 820 where nodes 0 and 7 carry one label each, and where one link has been selected for the attachment of nodes 3 and 5, respectively. FIG. 8 corresponds with the preferred reading of the sentence; node 3 labelled "on" is attached to node 2 labelled "light", and node 5 labelled "with" is attached to node 0 labelled "see". This reading suggests that "see" is modified by "with a telescope", and "light" is modified by "on the hill". FIG. 9 corresponds with the reading wherein node 0 is labelled "saw", meaning that the light is serrated using the telescope; obviously, this reading is less likely to be correct than a reading corresponding with FIG. 8. FIGS. 10 to 27 correspond with 18 other readings of the sentence in order to illustrate the variety of possible meanings.

A graph may be described by listing a collection of description elements for the graph, wherein each element is either a labelled node, such as "$see_0$" or a labelled link, such as "$mod_{27}$".

Using this format, the pragmatically preferred analysis of the sentence, corresponding to the source graph 801 shown in FIG. 8, is the set {$see_0$, $arg1_{01}$, $i_1$, $arg2_{02}$, $light_2$, $mod_{27}$, $green1_7$, $mod_{23}$, $on_3$, $arg2_{34}$, $hill_4$, $mod_{05}$, $with_5$, $arg2_{56}$, $telescope_6$}.

The plurality of possible analyses determines a plurality of sets of description elements. Such a plurality of sets of description elements may be considered as a commutative language over the vocabulary of all possible description elements, wherein each word in such a language corresponds to one analysis and is a list of description elements, the order of which being irrelevant.

The main advantage of taking this view of ambiguous structures is that formal language theory provides standard tools for representing languages compactly. Thus, it is known in computational lexicography that a large list of word strings can be represented efficiently by means of a finite-state automaton which factorizes common substrings. Such a representation is both compact and "explicit"; accessing and using it is as direct as the flat list of words would be.

Finite-state models may also be used for representing the language associated with a plurality of graphs compactly. However, these models are less powerful than the approach employing context-free grammar disclosed herein.

Turning back to the example, the context-free grammar $G_0$ may be defined as:

S→SAW ON WITH D3
SAW→D0 $arg1_{01}$ $i_1$ $arg2_{02}$ LIGHT
LIGHT→GREEN $mod_{27}$ $light_2$
GREEN→$green1_7$|$green2_7$
ON→$on_3$ $arg2_{34}$ $hill_4$
WITH→$with_5$ $arg2_{56}$ $telescope_6$
D0→$see_0$|$saw_0$
D3→$mod_{03}$ D30|$mod_{23}$ D32
D30→$mod_{05}$|$mod_{45}$
D32→$mod_{05}$|$mod_{25}$|$mod_{45}$ In this representation, non-terminals of the grammar are denoted in uppercase, and terminals, that are description elements of the source packed graph, are denoted in lowercase. It can be shown that the language generated by this grammar is the plurality of commutative words corresponding to the possible analyses for the sentence.

A simple bottom-up computation involving multiplications and sums can establish that there are 20 such words. The number of words that a non-terminal N generates is the ambiguity degree ad(N). In the example, the ambiguity degrees are:

ad(D30)=2
ad(D32)=3
ad(D3)=ad(D30)+ad(D32)=5, . . . , and
ad(S)=ad(SAW)×ad(ON)×(WITH)×ad(D3)=4×1×1×5= 20.

The multiplications appearing in such computations are responsible for the compactness of the grammar as compared to the direct listing of the words; each time a multiplication appears, a factorization is exploited.

As can be seen from the example, context-free representations of ambiguous structures have the important property of being easily "countable". This is to be contrasted with the other possible representations for ambiguous structures, such as representations based on propositional axioms determining which description elements can be jointly present in a given analysis. In these representations, the problem of determining whether there exists one structure satisfying the specification can be of high complexity, let alone the problem of counting such structures. Another important property of the chosen representations, that also sets them apart from propositional representations, is that they are interaction-free; a top-down traversal of the grammar does not produce conflicts and does not need to backtrack.

For non-ambiguous structures, the transfer may be defined as a re-writing process that takes a source-language graph as an input and constructs a target-language graph by applying transfer rules of the form lhs→rhs, where lhs and rhs are finite sets of description elements for the source graph and the target graph, respectively. In a "non-ambiguous" transfer process, for each non-overlapping covering of the source graph with left-hand sides of transfer rules, the corresponding right-hand sides are produced and taken together represent a target graph. As there can be several such coverings, this is a non-deterministic function.

In the transfer process for ambiguous structures, the aim of the transfer is to take a language of source graphs as input and to produce a language of target graphs. The language of target graphs should be equal to the plurality of all graphs that would have been obtained when the source graphs were enumerated one by one, non-ambiguous transfer were applied, and the plurality of obtained target graphs were taken. Thus, it is an object of the ambiguous transfer to perform a same task on the basis of a compact representation for the plurality of source graphs, yielding a compact representation for the plurality of target graphs.

For the example, a plurality of transfer rules may be defined as:

$see_0$→$voir_0$
$saw_0$→$scier_0$ light$_2$→lumière$_2$ light$_2$, mod$_{27}$, green1$_7$→feu$_2$, mod'$_{27}$, vert$_7$ green1$_7$→vert$_7$ green2$_7$→gazon$_7$ i$_1$→je$_1$ hill$_4$→colline$_4$ mode$_{03}$→mod'$_{03}$ and so on.

It should be noted that remaining straightforward one-to-one correspondences may be easily listed. For disjointness of source vocabulary and target vocabulary, labels such as "mod", "arg1" and so on are primed. In general, the transfer rules are not specialized for specific nodes, but have patterns containing variables instead of numbers. Hence, in order to obtain basic rules, a pre-processing step, that may be readily defined, may be necessary.

Before turning to the algorithm, some formal aspects are discussed in more detail. The commutative monoid over the alphabet A is denoted by $C(A^*)$, and its words are represented by vectors of $N^A$, indexed by A and with entries in N, where N is a set of integers. For each $\omega \in N^A$, the component indexed by $a \in A$ is denoted by $\omega_{[a]}$ and indicates the number of a's occurring in $\omega$. The product, i.e. concatenation, of $\omega_1$ and $\omega_2$ in $C(A^*)$ is the vector $\omega \in N^A$ such that $\forall a \in A: \omega_{[a]} = \omega_{1[a]} + \omega_{2[a]}$. A language of the commutative monoid is a subset of $C(A^*)$.

The subword relation is denoted by $\prec$. For a language L, $\upsilon \prec L$ if there exists $\omega \in L$ such that $\upsilon \prec \omega$. The re-writing is performed from a source language $L_S$ over a source alphabet $\Sigma_S$ to a target language $L_T$ over a target alphabet $\Sigma_T$ being disjoined from $\Sigma_S$ with respect to a set of re-writing rules $R \subset \Sigma_S^+ \times \Sigma_T^*$. The re-writing rules have the form $\lambda \to \rho$. Assuming in the sequel that any $a \in \Sigma_S$ appears at most once on any left-hand side of each transfer rule of R and also at most once in any word of source language $L_S$, this property may be preserved by all re-writings, that are described below.

The mapping LHS is defined by $LHS(\lambda \to \rho) = \lambda$. For $R \subset R$, $LeftSet(R) = \{a \in \Sigma_S | \exists r \in R \text{ such that } a \prec LHS(r)\}$ is defined.

The re-writing is a function $\phi_R$ taking source language $L_S$ and yielding target language $L_T$, and is defined as:

$$\phi_R(L_S) = \{\rho_1 \ldots \rho_P | \exists \omega \in L_S, \omega = \lambda_1 \ldots \lambda_P \wedge \lambda_1 \to \rho_1 \in R \wedge \ldots \wedge \lambda_P \to \rho_P \in R\}.$$

Two auxiliary functions are defined as:

$$\phi_{\lambda \to \rho}(L) = \{\rho \omega | \lambda \omega \in L\} \text{ and}$$

$$\phi_a(L) = \{\omega \in L | \omega_{[a]} = 0\}, \text{ and}$$

apply to any language L over $C(\Sigma^*)$, where $\Sigma = \Sigma_S \cup \Sigma_T$.

The $\phi_{\lambda \to \rho}$ functions are applied so that source symbols are guaranteed to be removed from the source language $L_S$ one by one. The source alphabet $\Sigma_S$ is considered as totally ordered by $\prec$ and may be written as $\Sigma_S = [a_1, a_2, \ldots a_N]$ with $a_i \prec a_{i+1}$. R may be partitioned into subsets $R_1, R_2, \ldots R_N$ such that $R_1$ contains all R-rules with $a_1$ in the LHS, $R_2$ contains all R-rules with $a_2$ but not $a_1$ in the LHS and so on, such that $R_N$ contains all R-rules with only $a_N$ in the LHS. Then, a third auxiliary function may be defined as:

$$\phi_{R_i}(L) = \phi_{a_i}(L) \cup \bigcup_{r \in R_i} \phi_r(L).$$

The target language $L_T$ may be obtained from the source language $L_S$ by iteratively applying the $R_i$ in the following manner:

$$\phi_{R_N}(\phi_{R_{N-1}}(\ldots \phi_{R_1}(L_S))) = L_T$$

When starting from the source language $L_S$, the $R_i$-rules are not applied to the language directly but to the grammars defining the languages. The source language $L_S$ may be defined by the context-free grammar $G_0 = (\Sigma, N_0, P_0, S_0)$. For $A \in N_0$, the set of all rules having A as LHS is denoted by $A \to \Sigma_{A \to \alpha \in P_0} \alpha$. This additive notation is a formal representation of $A \to a1|a2| \ldots$ . Hence, $A \to 0$ means that no rule defines A.

First $\phi_{R_1}$ is applied on $G_0$ producing $G_1 = (\Sigma, N_1, P_1, S_1)$, then $\phi_{R_2}$ is applied on $G_1$ producing $G_2$ and so on. During each iteration, new non-terminals of the form $(A)_{R_i}$, $(A)_{\lambda \to \rho}$ or $(A)_{\bar{a}}$ are introduced, wherein $A \in N_{i-1}$, $\lambda \in \Sigma_S^+$, $\rho \in \Sigma_T^*$ and $a \in \Sigma_S$. Each non-terminal is defined by a formal sum as described above.

Since the languages are considered to be commutative, the order of the symbols in the RHSs of the grammar rules is irrelevant. Hence, the RHSs of the grammar rules can be denoted by $x\beta$ such that $x \in C(\Sigma^*)$ and $\beta \in C(N^*)$, where N is the set of all non-terminals considered.

The algorithm may be readily implemented into a computer program. Although the algorithm will be described with reference to a procedure and functions provided in pseudo-code, those skilled in the art will appreciate that the algorithm may be implemented to the same effect using a variety of concepts and approaches to software programming. The algorithm utilizes an agenda containing new non-terminals to be defined in $G_i$. In the preferred embodiment, the agenda is implemented as a table, and each non-terminal is treated at most once.

Using pseudo-code, the procedure may be described as:

```
procedure main;
    for i ∈ {1, ... , N} do
        initialize P_i with P_{i-1};
        if R_i ≠ ∅ then
            initialize Agenda with (S_{i-1})_{R_i};
        repeat
            remove NonTerm from Agenda;
            switch NonTerm is
                case (A)_{R_i} :
                    add (A)_{R_i} → Σ_{A→α ∈ P_{i-1}} Φ_{R_i}(α) to P_i;
                case (A)_{λ→ρ} :
                    add (A)_{λ→ρ} → Σ_{A→α ∈ P_{i-1}} Φ_{λ→ρ}(α) to P_i;
                case (A)_{ā} :
                    add (A)_{ā} → Σ_{A→α ∈ P_{i-1}} Φ_{ā}(α) to P_i;
            end switch;
        until Agenda is empty;
        reduce G_i whose axiom is S_i = (S_{i-1})_{R_i};
        /* remove non-terminals that are
            non-productive (L(A) = ∅)
        */

/* or inaccessible from S_i */
    end for;
```

-continued end if;

end procedure;

Similarly, the re-writing functions may be described as:

function $\Phi_{R_i}(x\beta)$; /* $\beta = A_1 \ldots A_k$ */ if $\exists\, j \in \{1, \ldots, k\}$ such that $\forall\, a \in LeftSet(R_i), a \prec L(A_j)$ then /* if all re-writings in $R_i$ can only affect $A_j$ */ add $(A_j)_{R_i}$ to Agenda;

return $xA_1 \ldots A_{j-1}(A_j)_{R_i}A_{j+1} \ldots A_k$;   (1)

else return $\Phi_{\overline{a_j}}(x\beta) + \Sigma_{r \in R_i}\Phi_r(x\beta)$;   (2)

end if;

end function;

function $\Phi_{\overline{a}}(x\beta)$; /* $\beta = A_1 \ldots A_k$ */ if $\exists\, j \in \{1, \ldots, k\}$ such that $a \prec L(A_j)$ then

/* j is unique; see below */ add $(A_j)_{\overline{a}}$ to Agenda;

return $xA_1 \ldots A_{j-1}(A_j)_{\overline{a}}A_{j+1} \ldots A_k$;   (3)

else if $a \prec x$ then return 0;

else return $x\beta$;

end if;

end if;

end function;

function $\Phi_{\lambda \to \rho}(x\beta)$; /* $\beta = A_1 \ldots A_k$ */ if $\exists\, j \in \{1, \ldots, k\}$ such that $\forall\, a \prec \lambda, a \prec L(A_j)$ then /* if letters of $\lambda$ appear only in $L(A_j)$ */ add $(A_j)_{\lambda \to \rho}$ to Agenda;

return $xA_1 \ldots A_{j-1}(A_j)_{\lambda \to \rho}A_{j+1} \ldots A_k$;   (4)

else consider $\omega_1, \ldots, \omega_k \in \Sigma_S *$ such that

-the longest common subword of $x$ and $\lambda$ is $y$,

-$y\omega_1\omega_2 \ldots \omega_k = \lambda$, and /* distribution of $\lambda$ over $x\beta$ */

-$\forall\, a \prec \omega_j, a \prec A_j$ if such a sequence exists then

/* it is unique; see below */ add to Agenda all $(A_j)_{\omega_j \to \varepsilon}$ such that $\omega_j \neq \varepsilon$;

return $x \Big/ y (\Pi_{w_j \neq \varepsilon}(A_j)_{\omega_j \to \varepsilon})$ $(\Pi_{\omega_j = \varepsilon} A_j)\rho$;   (5)

/* recall that products are concatenations */

/* $x/y$ is $x$ without substring $y$ */ else return 0;

end if;

end if;

end function;

For unicity of j in function $\Phi_{\overline{a}}$, $A \to xXYy \in P_{i-1}$ is considered. As each source symbol occurs at the most once in every word of $L(S_{i-1})$, the same holds for $L(A)$, hence, the sets of source symbols occurring in $L(X)$ and $L(Y)$ are disjoined.

In case that the agenda is handled as a stack, the grammars are traversed depth-first, and in case that it is handled as a queue, they are traversed breadth-first.

Figure 4:
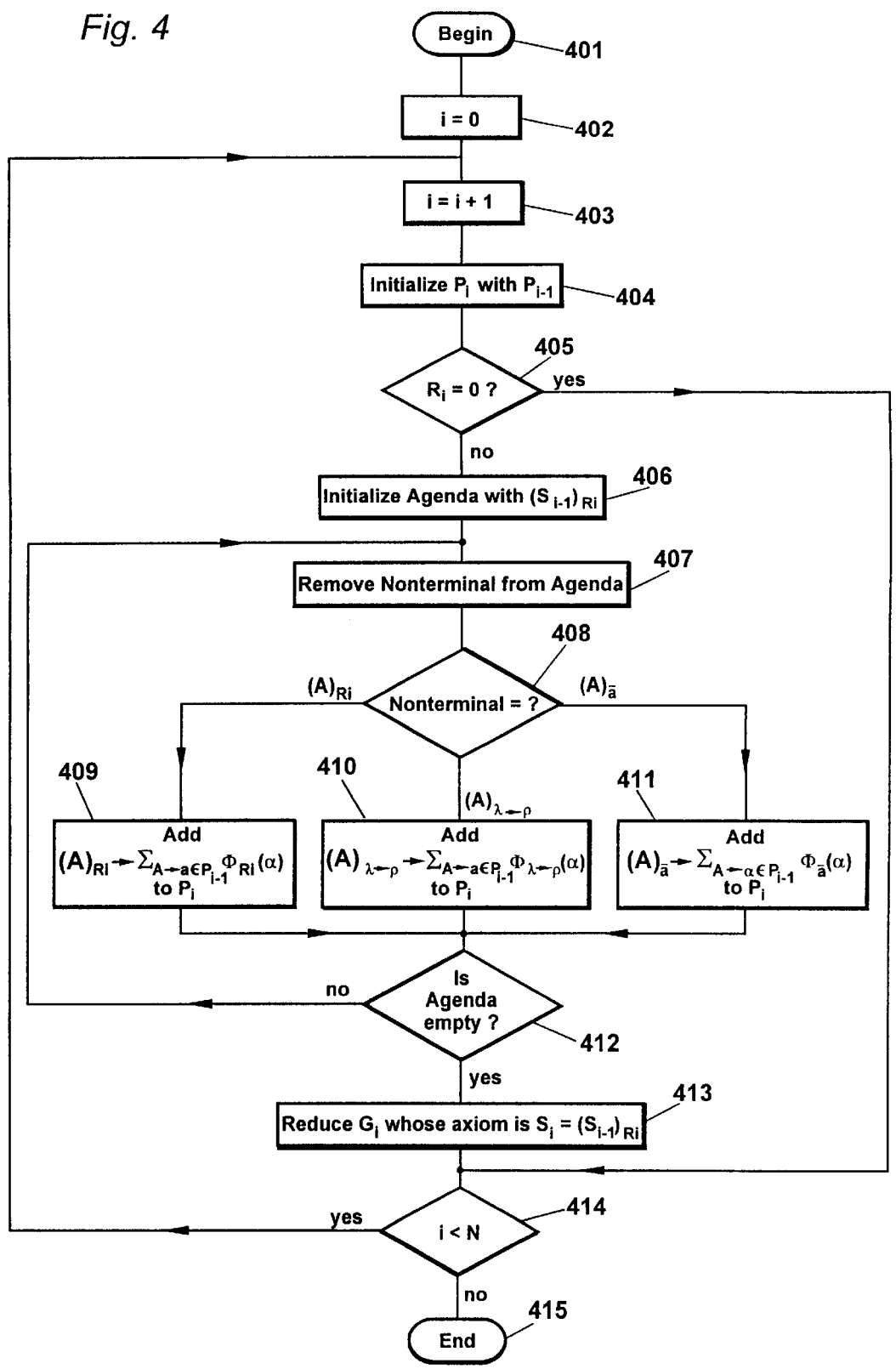
FIG. 4 illustrates a flow chart of the method according to the preferred embodiment of the invention.

FIG. 4 illustrates a flow-chart of the preferred embodiment of the procedure. After entering the procedure in step 401, a loop counter is initialized in step 402. In order to keep track of the number of iterations, the counter is incremented in step 403. In step 404 rules $P_i$ are initialized with previous rules $P_{i-1}$. In step 405, it is determined whether a transfer rule $R_i$ is empty. In case that the transfer rule $R_i$ is determined to be empty, no processing is necessary and the procedure branches to step 414, that is the closing statement of the loop. However, in case that the transfer rule $R_i$ is determined not to be empty, the agenda is initialized with $(S_{i-1})R_i$ in step 406. In step 407, a non-terminal is removed from the agenda. In step 408, the type, i.e. $(A)_{R_i}, (A)_{\lambda \to \rho}$ and $(A)\overline{a}$, is evaluated. According to the determined type, the procedure branches in step 409, 410 or 411 to the corresponding function and adds the resulting term to $P_i$. In step 412, it is determined whether the agenda is empty. In case that it is determined that the agenda is not empty, the procedure branches back to step 407 in order to process the next non-terminal. In case that it is determined that the agenda is empty, the procedure proceeds to step 413, where the grammar $G_i$ whose axiom is $S_i = (S_{i-1})R_i$ is reduced. In step 414, it is determined whether the loop is completed. In case that the loop is not completed, the procedure branches back to step 403. In case that the loop is completed, the program ends at step 415.

Figure 5:
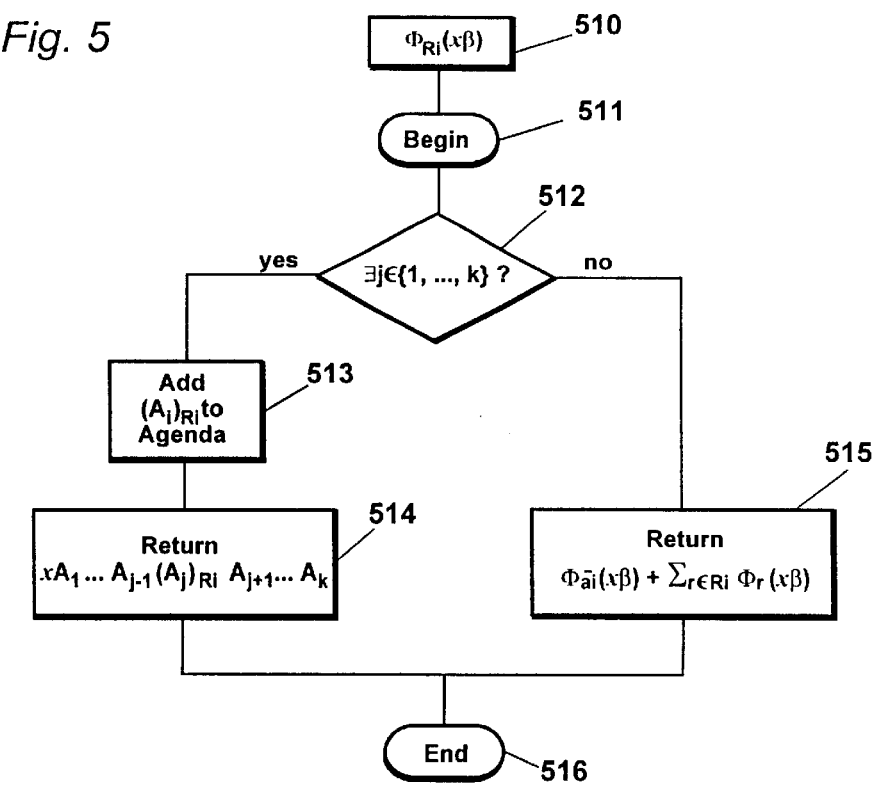
FIGS. 5 to 7 illustrate flowcharts of the rewriting functions according to the preferred embodiment of the invention.
Figure 6:
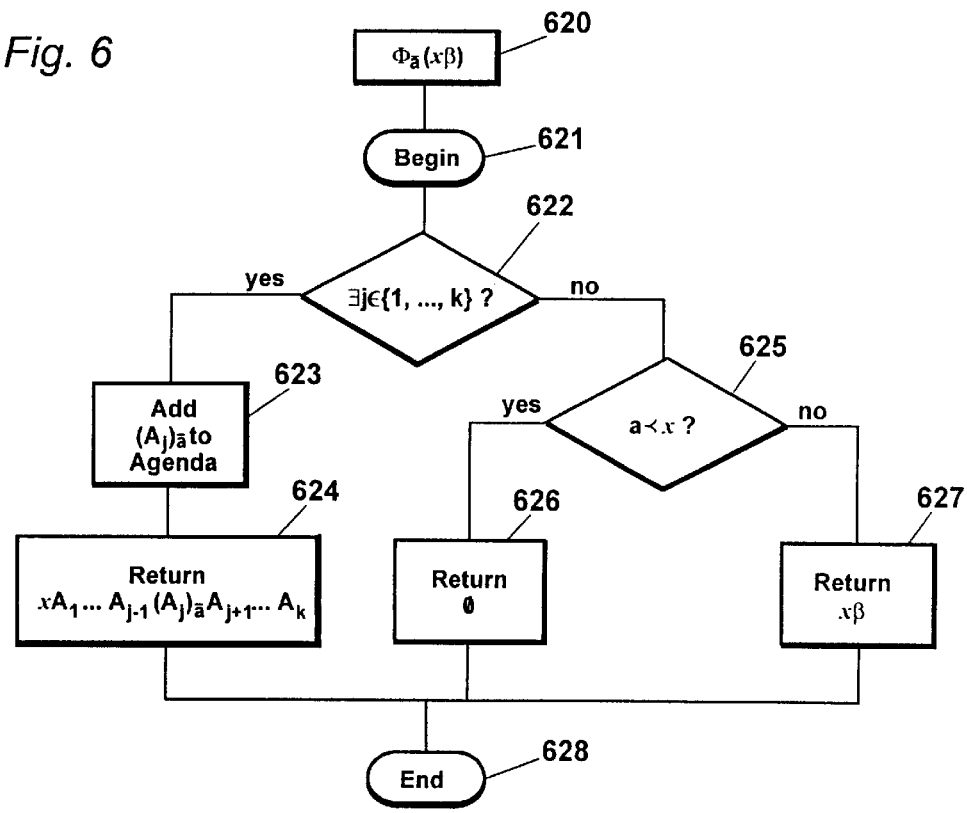
Figure 7:
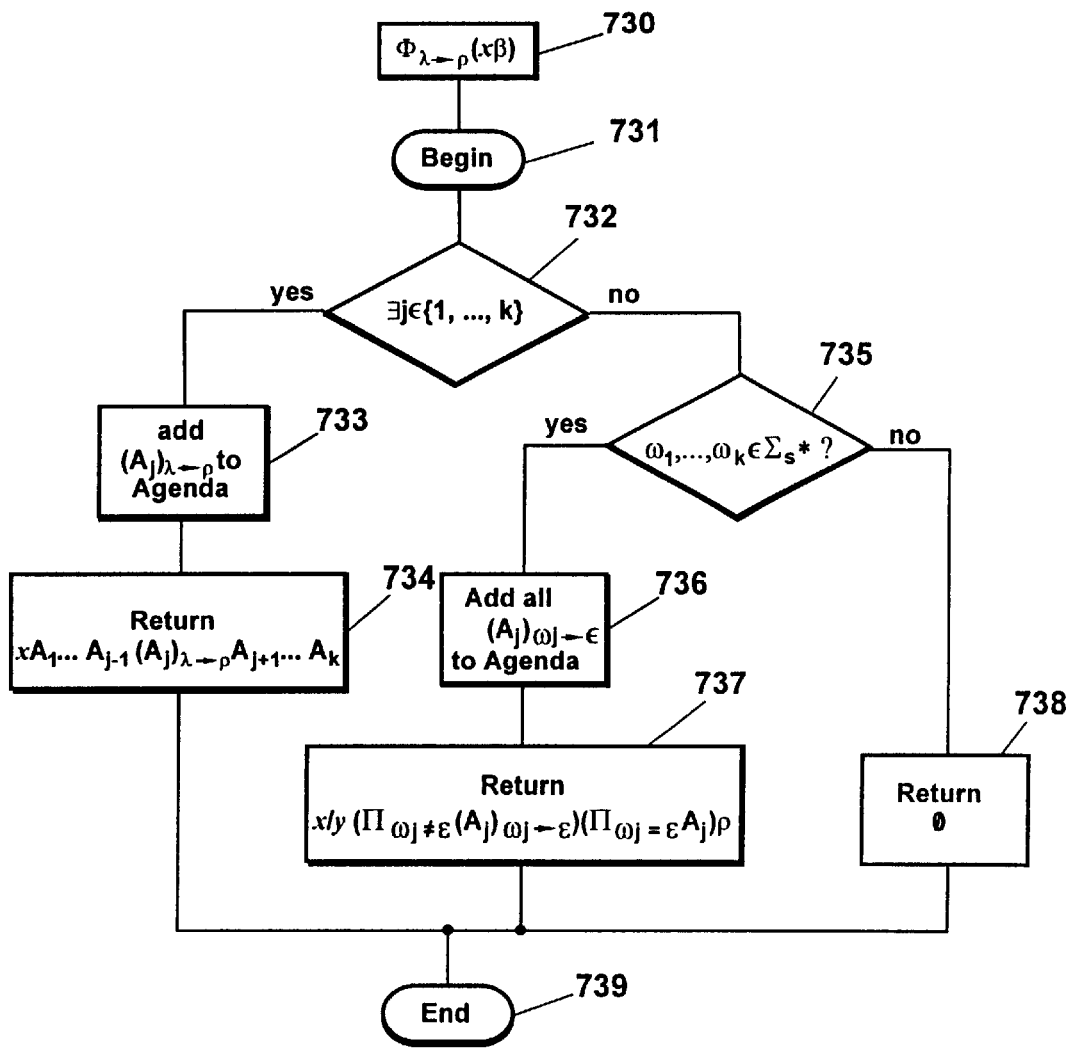

In steps 409, 410 and 411, the procedure branches to one of three functions shown in more detail in FIGS. 5 to 7. The function $\Phi_{R_i}(x\beta)$ begins at step 511. In step 512, it is determined whether $\exists j \in \{1, \ldots, k\}$ such that $\forall a \in LeftSet(R_i), a \prec L(A_j)$. If it is determined that $\exists j \in \{1, \ldots, k\}$, $(A_j)_{R_i}$ are added to the agenda is step 513, and $xA_1 \ldots A_{j-1}(A_j)_{R_i}A_{j+1} \ldots A_k$ are returned in step 514. Otherwise, functions $\Phi_{\overline{a}}(x\beta)$ and $\Phi_{\lambda \to \rho}(\phi\beta)$ are called in step 515. The function ends at step 516.

The function $\Phi_{\overline{a}}(x\beta)$ begins at step 621. In step 622, it is determined whether $\exists j \in \{1, \ldots, k\}$ such that $a \prec L(A_j)$. In case that it is determined that $\exists j \in \{1, \ldots, k\}$, in step 623, $(A_j)_{\overline{a}}$ is added to the agenda, and $xA_1 \ldots A_{j-1}(A_j)_{\overline{a}}A_{j+1} \ldots A_k$ is returned in step 624. Otherwise, it is determined in step 625 whether $a \prec x$. In case that it is determined that $a \prec x$, 0 is returned in step 626, otherwise $x\beta$ is returned in step 627. The function ends at step 628.

The function $\Phi_{\lambda \to \rho}(x\beta)$ begins at step 731. In step 732, it is determined whether $\exists j \in \{1, \ldots, k\}$ such that $\forall a \prec \lambda, a \prec L(A_j)$. In case that it is determined that $\exists j \in \{1, \ldots, k\}$, $(A_j)_{\lambda \to \rho}$ is added to the agenda in step 733 and $xA_1 \ldots A_{j-1}(A_j)_{\lambda \to \rho}A_{j+1} \ldots A_k$ is returned in step 734. Otherwise, it is determined in step 735 whether $\omega_1, \ldots, \omega_k \in \Sigma_S^*$ such that the longest common subword of x and $\lambda$ is y, $y\omega_1\omega_2 \ldots \omega_k=\lambda$ and $\forall a \prec \omega_j$, $a \prec A_j$. In case that it is determined that $\omega_1, \ldots, \omega_k \in \Sigma_S^*$, all $(A_j)_{\omega_1 \to \epsilon}$ such that $\omega_j \ne \epsilon$ are added to the agenda in step 736, and $x/y(\Pi_{\omega w_j \ne \epsilon}(A_j)_{\omega_j \to \epsilon})(\Pi_{\omega_j = \epsilon} A_j)\rho$ is returned in step 737. Otherwise, 0 is returned in step 738. The function ends at step 739.

Turning back to the example, the source alphabet is $\Sigma_S=[i_1, \text{green}1_7, \text{green}2_7, \text{see}_0, \ldots]$, so that R is partitioned into $R_1=\{i_1 \to je\}$, $R_2=\{\text{green}1_7 \to \text{vert}_7, \text{green}1_7 \text{ mod}_{27} \text{ light}_2 \to \text{feu}_2 \text{ mod}_{27} \text{vert}_7\}$ and so on. Every other $R_i$ comprises a single rule.

During the first iteration of the algorithm, the grammar $G_1=\Phi_{R_i}(G_0)$ is computed. The result is:

$(S_0)_{R_i} \to (SAW)_{R_i}$ ON WITH D3

$(SAW)_{R_i} \to D0 \text{ arg}1_{01} \text{ arg}2_{02}$ LIGHT $je_1$

LIGHT$\to$GREEN mod$_{27}$ light$_2$

GREEN$\to$green$1_7$|green$2_7$

ON$\to$on$_3$ arg$2_{34}$ hill$_4$

WITH$\to$with$_5$ arg$2_{56}$ telescope$_6$ and so on.

The only non-terminals that have been re-defined are $S=S_0$ and SAW. The computation of $(S_0)_{R_i}$ has been done through equation (1) of the algorithm, that is step 514, since the terminals on the left-hand sides of $R_1$, namely the single terminal $i_1$, are all "concentrated" on the single non-terminal SAW on the right-hand side of $S_0$. This, in turn, leads to the requirement for a definition of $(SAW)_{R_i}$, which is obtained by equation (5) of the algorithm, that is step 737, whereby the re-writing of $i_1$ into $je_1$ is performed.

For any group of rules $R_i$, as long as all terminals on the left-hand sides of rules $R_i$ are concentrated on at most one non-terminal on a right-hand side, no expansion of rules is necessary. It is only when the terminals are distributed on several RHS terminals or non-terminals that expansion is required.

This situation occurs during the second iteration of the algorithm, wherein $G_1$ is mapped into $G_2=\Phi_{R_2}(G_1)$. The result is:

$((S_0)_{R_1})_{R_2} \to ((SAW)_{R_1})_{R_2}$ ON WITH D3

$((SAW)_{R_1})_{R_2} \to D0 \text{ arg}1_{01} \text{ arg}2_{02}$ $(LIGHT)_{R_2}$ $je_1$ $(LIGHT)_{R_2} \to (GREEN)_{\overline{\text{green}1_7}}$ mod$_{27}$ light$_2$

|$(GREEN)_{\text{green}1_7 \to \text{vert}_7}$ mod$_{27}$ light$_2$

|$(GREEN)_{\text{green}1_7 \to \epsilon}$ feu$_2$ mod'$_{27}$ vert$_7$ $(GREEN)_{\overline{\text{green}1_7}} \to$ green$2_7$ $(GREEN)_{\text{green}1_7 \to \text{vert}_7} \to$ vert$_7$ $(GREEN)_{\text{green}1_7 \to \epsilon} \to \epsilon$ ON$\to$on$_3$ arg$2_{34}$ hill$_4$ WITH$\to$with$_5$ arg$2_{56}$ telescope$_6$ and so on.

The terminals on the left-hand sides of $R_2$ are green$1_7$, mod$_{27}$ and light$_2$. First, $((S_0)_{R_1})_{R_2}$ should be computed. Again, these three terminals are concentrated on $(SAW)_{R_1}$. This fact is immediately known to the algorithm which maintains a table telling the algorithm which non-terminals are "touched" by which terminals. Thus, only $((SAW)_{R_1})_{R_2}$ needs to be defined. Once again, the three terminals are concentrated on LIGHT, and $(LIGHT)_{R_2}$ needs to be defined.

At this point, it is not the case anymore that one non-terminal on the right-hand side of the rule defining LIGHT concentrates all the terminals. In fact, GREEN only "touches" green$1_7$ but not the other two terminals. Thus, the algorithm re-courses to equation (2) of the algorithm, that is step 515, defining three rules involving recursive calls to $\Phi_{\overline{\text{green}1_7}}$, $\Phi_{\text{green}1_7 \to \text{vert}_7}$ and $\Phi_{\text{green}1_7 \text{mod}_{27} \text{light}_2 \to \text{feu}_2 \text{mod}'_{27} \text{vert}_7}$. The first of these calls involves equation (3), that is step 624, the second call involves equation (4), that is step 734, and the third call involves equation (5), that is step 737, resulting in the three expansions shown for $(LIGHT)_{R_2}$, and leading eventually to the definitions of the three variants of the non-terminal GREEN.

The remaining iterations of the re-writing process are of the same type as for the first iteration. The result of the re-writing process is a target grammar of the form:

S'$\to$SAW' ON' WITH' D3'

SAW'$\to$D0' arg1$_{01}$ arg2'$_{02}$ LIGHT' $je_1$

LIGHT'$\to$GREEN' mod'$_{27}$ lumière$_2$|GREEN" mod'$_{27}$ lumière$_2$

|feu$_2$ mod'$_{27}$ vert$_7$

GREEN'$\to$gazon$_7$

GREEN"$\to$vert$_7$

ON'$\to$sur$_3$ arg2'$_{34}$ colline$_4$

WITH'$\to$avec$_5$ arg2'$_{56}$ lunette$_6$

D0'$\to$voir$_0$|scier$_0$

D3'$\to$mod'$_{03}$ D30'|mod'$_{23}$ D32'

D30'$\to$mod'$_{05}$|mod'$_{45}$

D32'$\to$mod'$_{05}$|mod'$_{25}$|mod'$_{45}$

The target grammar is only slightly less compact that the source grammar. Computing the ambiguity degree, for example, it can be determined that the target grammar enumerates 30 target graphs. The additional ten graphs, compared to the number of source graphs defined by the source grammar, result from the addition of the French variant "feu vert" along with "lumière verte" for the English wording "green light".

Figure 29:
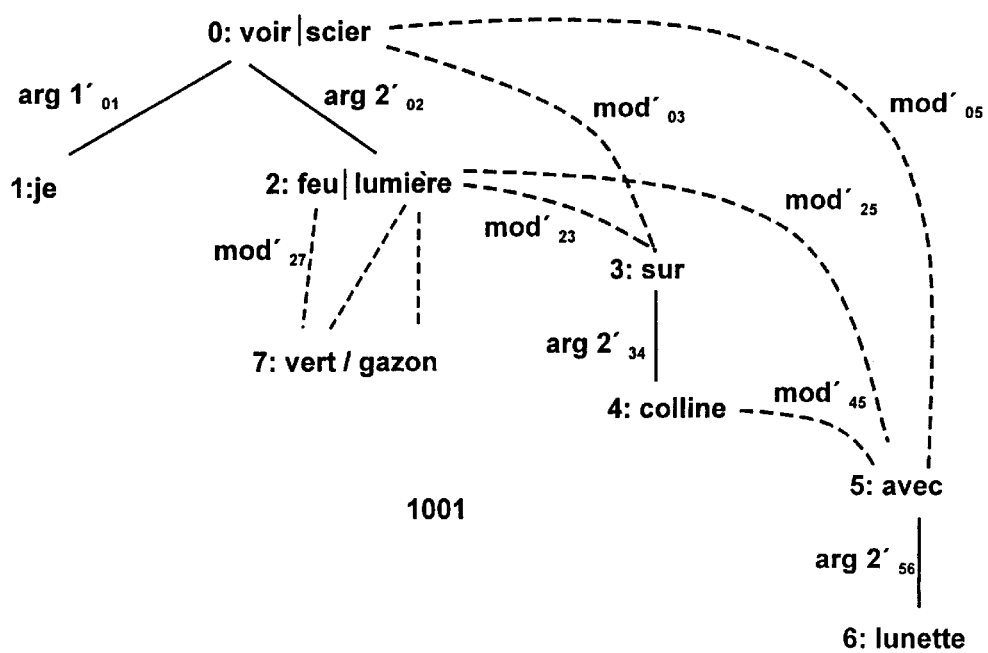
FIG. 29 illustrates a packed target graph of the example.

FIG. 29 illustrates, using the conventions described with reference to FIGS. 28, the packed target graph of the example. A plurality of target graphs may be easily obtained therefrom.

As those skilled in the art will appreciate, other various modifications, extensions, and changes to the foregoing disclosed embodiments of the present invention are contemplated to be within the scope and spirit of the invention as defined in the following claims.

The claimed invention is:

1. A computer implemented method for transforming a first expression in a first language into a second expression in a second language, comprising:

generating a first packed representation of the first expression; and transferring the first packed representation into a second packed representation of the second expression using transfer rules, each transfer rule defining, for a first combination of one or more elements occurring in the first packed representation, a way to re-write the first combination to obtain a second combination of one or more elements occurring in the second packed representation, wherein:

the first packed representation is a context-free phrase-structure grammar defining one or more representations of the first expression;

the second packed representation is a context-free phrase-structure grammar defining one or more representations of the second expression;

the set of transfer rules includes at least one rule in which the first combination or the second combination includes more than one elemental.

2. The method as claimed in claim 1, wherein the transfer rules are iteratively applied to the first packed representation and resulting intermediate representations.

3. The method as claimed in claim 1, wherein each representation comprises at least some elements of the types predicate name, argument and modifier.

4. The method as claimed in claim 1, wherein each representation corresponds with a graph having nodes, links and labels.

5. The method as claimed in claim 1, wherein each representation is commutative, such that its elements are permutable.

6. The method as claimed in claim 1, wherein generating the first packed representation comprises:

obtaining a first plurality of representations from the first expression, each representation defining one of a first plurality of meanings in the first language; and obtaining the first packed representation from the first plurality of representations.

7. The method as claimed in claim 6, further comprising obtaining a second plurality of representations from the second packed representation, each representation defining one of a second plurality of meanings in the second language.

8. The method as claimed in claim 1, wherein the first expression is spoken text.

9. The method as claimed in claim 1, wherein the first expression is written text.

10. The method as claimed in claim 1, wherein the second language is machine-compatible.

11. The method as claimed in claim 1, wherein transferring the first packed representation into a second packed representation of the second expression using transfer rules comprises iteratively applying the transfer rules to the first packed representation, wherein at least one resulting intermediate representation results from applying the transfer rules to the first packed representation or a previous resulting intermediate representation.

12. The method as claimed in claim 1, wherein transferring the first packed representation into the second packed representation comprises transforming the context-free grammar representing the first packed representation into the context-free grammar representing the second packed representation.

13. A computer implemented method for performing a transfer of a collection of source graphs sharing certain subparts into a collection of target graphs, each source graph being a word over a source vocabulary of description elements, the description elements comprising nodes, links and labels, the collection of source graphs being a source language over the source vocabulary, each target graph being a word over a target vocabulary of description elements, the collection of target graphs being a target language over the target vocabulary, the method comprising:

obtaining a packed source structure representing the collection of source graphs, the packed source structure being a context-free source grammar defining the source language; and generating a packed target structure from the packed source structure, the packed target structure being a context-free target grammar defining the target language, wherein:

the transfer is performed using transfer rules, each transfer rule defining, for a first combination of one or more elements occurring in the collection of source graphs, a way to re-write the first combination to obtain a second combination of one or more elements occurring in the collection of target graphs; and the transfer rules including at least one transfer rule in which the first combination or the second combination includes more than one element.

14. The method as claimed in claim 13, further comprising obtaining the collection of target graphs from the packed target structure.

15. The method as claimed in claim 13, wherein generating the packed target structure comprises applying transfer rules to the packed source structure to obtain the packed target structure.

16. The method as claimed in claim 15, wherein the transfer rules are iteratively applied.

17. The method as claimed in claim 15, wherein the transfer rules are recursively applied.

18. The method as claimed in claim 13, wherein the target grammar preserves factorization properties and compactness of the source grammar.

19. The method as claimed in claim 13, wherein each grammar is commutative, such that its description elements are permutable.

20. The method as claimed in claim 13, wherein each grammar comprises a collection of rules, each rule having a left-hand side and a right-hand side.

21. The method as claimed in claim 13, wherein each source graph corresponds with a meaning of an expression in a first language.

22. The method as claimed in claim 15, wherein the transfer is performed by iteratively applying the transfer rules to the first packed representation, wherein at least one resulting intermediate representation results from applying the transfer rules to the first packed representation or a previous resulting intermediate representation.

23. The method as claimed in claim 13, wherein generating the packed target structure from the packed source structure comprises transforming the context-free source grammar of the packed source structure representation into the context-free target grammar of the packed target structure representation.

24. A computer implemented method for performing a transfer of a collection of source representations having at least some portions in common into a collection of target representations, each source representation being a word over a source vocabulary of description elements, the collection of source representations being a source language over the source vocabulary, each target representation being a word over a target vocabulary of description elements, the collection of target representations being a target language over the target vocabulary, the method comprising:

obtaining a packed source structure representing the collection of source representations, the packed source structure being a context-free source grammar defining the source language; and generating a packed target structure from the packed source structure, the packed target structure being a context-free target grammar defining the target language, wherein:

the transfer is performed using transfer rules, each transfer rule defining, for a first combination of one or more elements occurring in the collection of source representations, a way to re-write the first combination to obtain a second combination of one or more elements occurring in the collection of target representations; and the transfer rules including at least one rule in which the first combination or the second combination includes more than one element.

25. The method as claimed in claim 24, further comprising obtaining the collection of target representations from the packed target structure.

26. The method as claimed in claim 24, wherein generating the packed target structure comprises applying transfer rules to the packed source structure to obtain the packed target structure.

27. The method as claimed in claim 26, wherein the transfer rules are iteratively applied.

28. The method as claimed in claim 26, wherein the transfer rules are recursively applied.

29. The method as claimed in claim 24, wherein the target grammar preserves factorization properties and compactness of the source grammar.

30. The method as claimed in claim 24, wherein each grammar is commutative, such that its description elements are permutable.

31. The method as claimed in claim 24, wherein each grammar comprises a collection of rules, each rule having a left-hand side and a right-hand side.

32. The method as claimed in claim 24, wherein each source representation corresponds with a meaning of an expression in a first language.

33. The method as claimed in claim 24, wherein each representation corresponds with a graph comprising nodes, links and labels.

34. The method as claimed in claim 15, wherein the transfer is performed by recursively applying the transfer rules to the first packed representation, wherein at least one resulting intermediate representation results from applying the transfer rules to the first packed representation or a previous resulting intermediate representation.

35. The method as claimed in claim 26, wherein the transfer is performed by iteratively applying the transfer rules to the first packed representation, wherein at least one resulting intermediate representation results from applying the transfer rules to the first packed representation or a previous resulting intermediate representation.

36. The method as claimed in claim 26, wherein the transfer is performed by recursively applying the transfer rules to the first packed representation, wherein at least one resulting intermediate representation results from applying the transfer rules to the first packed representation or a previous resulting intermediate representation.

37. The method as claimed in claim 20, wherein the left hand side of each rule and the right hand side of each rule are finite sets of description elements of the source graph and target graph.

38. The method as claimed in claim 31, wherein the left hand side of each rule and the right hand side of each rule are finite sets of description elements of the source representation and target representation.

39. The method as claimed in claim 24, wherein generating the packed target structure from the packed source structure comprises transforming the context-free source grammar of the packed source structure representation into the context-free target grammar of the packed target structure representation.

40. A system that transforms a first expression in a first language into a second expression in a second language, comprising:
a joint circuit structure that generates a first packed representation of the first expression; and
a second circuit structure that transfers the first packed representation into a second packed representation of the second expression using transfer rules, each transfer rule defining, for a first combination of one or more elements occurring in the first packed representation, a way to re-write the first combination to obtain a second combination of one or more elements occurring in the second packed representation, wherein:
the first packed representation is a context-free phrase-structure grammar defining one or more representations of the first expression;
the second packed representation is a context-free phrase-structure grammar defining one or more representations of the second expression;
the set of transfer rules includes at least one rule in which the first combination or the second combination includes more than one element.

41. The method as claimed in claim 40, wherein transferring the first packed representation into the second packed representation comprises transforming the context-free grammar representing the first packed representation into the context-free grammar representing the second packed representation.

42. A system that transfers a collection of source graphs sharing certain subparts into a collection of target graphs using transfer rules, each source graph being a word over a source vocabulary of description elements, the description elements comprising nodes, links and labels, the collection of source graphs being a source language over the source vocabulary, each target graph being a word over a target vocabulary of description elements, the collection of target graphs being a target language over the target vocabulary, the system comprising:
means for obtaining a packed source structure representing the collection of source graphs, the packed source structure being a context-free source grammar defining the source language; and
means for generating a packed target structure from the packed source structure, the packed target structure being a context-free target grammar defining the target language, wherein:
each transfer rule defines, for a first combination of one or more elements occurring in the collection of source graphs, a way to re-write the first combination to obtain a second combination of one or more elements occurring in the collection of target graphs; and
the transfer rules include at least one rule in which the first combination or the second combination includes more than one element.

43. The method as claimed in claim 42, wherein generating the packed target structure from the packed source structure comprises transforming the context-free source grammar of the packed source structure representation into the context-free target grammar of the packed target structure representation.

44. A system that transfers a collection of source representations having at least some portions in common into a collection of target representations using transfer rules, each source representation being a word over a source vocabulary of description elements, the collection of source representations being a source language over the source vocabulary, each target representation being a word over a target vocabulary of description elements, the collection of target representations being a target language over the target vocabulary, the system comprising:
means for obtaining a packed source structure representing the collection of source representations, the packed source structure being a context-free source grammar defining the source language; and
means for generating a packed target structure from the packed source structure, the packed target structure being a context-free target grammar defining the target language, wherein:

each transfer rule defines, for a first combination of one or more elements occurring in the collection of source representations, a way to re-write the first combination to obtain a second combination of one or more elements occurring in the collection of target representations; and the transfer rules includes at least one rule in which the first combination or the second combination includes more than one element.

45. The method as claimed in claim 44, wherein generating the packed target structure from the packed source structure comprises transforming the context-free source grammar of the packed source structure representation into the context-free target grammar of the packed target structure representation.

46. A computer program product, for use in a computer system, for transforming a first expression in a first language into a second expression in a second language, comprising:

instructions for generating a first packed representation of the first expression; and instructions for transferring the first packed representation into a second packed representation of the second expression using transfer rules, each transfer rule defining, for a first combination of one or more elements occurring in the first packed representation, a way to re-write the first combination to obtain a second combination of one or more elements occurring in the second packed representation, wherein:

the first packed representation is a context-free phrase-structure grammar defining one or more representations of the first expression;

the second packed representation is a context-free phrase-structure grammar defining one or more representations of the second expression;

the set of transfer rules includes at least one rule in which the first combination or the second combination includes more than one element.

47. The computer program product as claimed in claim 46, comprising a computer-readable medium for storing the instructions.

48. The method as claimed in claim 46, wherein transferring the first packed representation into the second packed representation comprises transforming the context-free grammar representing the first packed representation into the context-free grammar representing the second packed representation.

49. A computer program product, for use in a computer system, for performing a transfer of a collection of source graphs sharing certain subparts into a collection of target graphs, each source graph being a word over a source vocabulary of description elements, the description elements comprising nodes, links and labels, the collection of source graphs being a source language over the source vocabulary, each target graph being a word over a target vocabulary of description elements, the collection of target graphs being a target language over the target vocabulary, the product comprising instructions for:

obtaining a packed source structure representing the collection of source graphs, the packed source structure being a context-free source grammar defining the source language; and generating a packed target structure from the packed source structure, the packed target structure being a context-free target grammar defining the target language; and where the transfer is done using transfer rules, each transfer rule defining, for a first combination of one or more elements occurring in the collection of source graphs, a way to re-write the first combination to obtain a second combination of one or more elements occurring in the collection of target graphs, the set of transfer rules including at least one rule in which the first combination or the second combination includes more than one element.

50. The computer program product as claimed in claim 49, comprising a computer-readable medium for storing the instructions.

51. The method as claimed in claim 49, wherein generating the packed target structure from the packed source structure comprises transforming the context-free source grammar of the packed source structure representation into the context-free target grammar of the packed target structure representation.

52. A computer program product, for use in a computer system, for performing a transfer of a collection of source representations having at least some portions in common into a collection of target representations, each source representation being a word over a source vocabulary of description elements, the collection of source representations being a source language over the source vocabulary, each target representation being a word over a target vocabulary of description elements, the collection of target representations being a target language over the target vocabulary, the product comprising instructions for:

obtaining a packed source structure representing the collection of source representations, the packed source structure being a context free source grammar defining the source language; and generating a packed target structure from the packed source structure, the packed target structure being a context-free target grammar defining the target language; and where the transfer is done using transfer rules, each of which defining, for a first combination of one or more elements occurring in the collection of source representations, a way to re-write the first combination to obtain a second combination of one or more elements occurring in the collection of target representations; the set of transfer rules including at least one rule in which the first combination or the second combination includes more than one element.

53. The computer program product as claimed in claim 52, comprising a computer-readable medium for storing the instructions.

54. The method as claimed in claim 52, wherein generating the packed target structure from the packed source structure comprises transforming the context-free source grammar of the packed source structure representation into the context-free target grammar of the packed target structure representation.

\* \* \* \* \*